(12) United States Patent
Mandel et al.

(10) Patent No.: US 10,456,968 B2
(45) Date of Patent: Oct. 29, 2019

(54) THREE-DIMENSIONAL OBJECT PRINTER WITH MULTI-NOZZLE EXTRUDERS AND DISPENSERS FOR MULTI-NOZZLE EXTRUDERS AND PRINTHEADS

(71) Applicant: Xerox Corporation, Norwalk, CT (US)

(72) Inventors: Barry P. Mandel, Fairport, NY (US); David A. Mantell, Rochester, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 994 days.

(21) Appl. No.: 14/962,126

(22) Filed: Dec. 8, 2015

(65) Prior Publication Data

US 2017/0157828 A1    Jun. 8, 2017

(51) Int. Cl.
*B29C 64/118* (2017.01)
*B29C 64/209* (2017.01)
(Continued)

(52) U.S. Cl.
CPC ............ *B29C 48/21* (2019.02); *B29C 64/118* (2017.08); *B29C 64/209* (2017.08); *B29C 64/321* (2017.08); *B29C 64/336* (2017.08); *B29C 64/343* (2017.08); *B29C 48/02* (2019.02); *B29C 48/05* (2019.02); *B29C 48/17* (2019.02);
(Continued)

(58) Field of Classification Search
CPC .............. B29C 47/0002; B29C 47/043; B29C 47/0866; B29C 47/1045; B29C 47/30; B29C 64/118; B29C 64/209; B29C 64/321; B29C 64/336; B29C 64/343; B29C 48/02; B29C 48/05; B29C 48/17; B29C 48/21;
(Continued)

(56) References Cited

U.S. PATENT DOCUMENTS

| 4,511,528 A | 4/1985 | Kudert et al. |
| 5,882,694 A | 3/1999 | Guillemette |

(Continued)

FOREIGN PATENT DOCUMENTS

| WO | 2014/200595 A2 | 12/2014 |
| WO | 2015/027938 A1 | 3/2015 |
| WO | 2015/077262 A1 | 5/2015 |

OTHER PUBLICATIONS

Sure Tack Systems; HA2 Series Extrusion Hot Melt Applicator; Brochure; 2018; 4 Pages; https://suretacksystems.com/extrusion/.
(Continued)

*Primary Examiner* — Joseph S Del Sole
*Assistant Examiner* — Joseph S Leyson
(74) *Attorney, Agent, or Firm* — Maginot Moore & Beck LLP

(57) ABSTRACT

A three-dimensional object printer includes a multi-nozzle extruder, at least one extrusion material supply, and a dispenser that provides extrusion material from the extrusion material supply to each of a plurality of channels, each channel supplying extrusion material to at least one nozzle in the multi nozzle extruder. The dispenser includes an inlet to receive extrusion material from at least one extrusion material supply, an outlet configured to direct the extrusion material to a channel in the plurality of channels, and an actuator configured to move the outlet into alignment with each channel in the plurality of channels.

22 Claims, 17 Drawing Sheets

(51) Int. Cl.
    *B29C 64/321*     (2017.01)
    *B29C 64/336*     (2017.01)
    *B29C 64/343*     (2017.01)
    *B29C 48/21*     (2019.01)
    *B33Y 30/00*     (2015.01)
    *B29K 55/02*     (2006.01)
    *B29L 9/00*     (2006.01)
    *B33Y 40/00*     (2015.01)
    *B29C 48/30*     (2019.01)
    *B29C 48/02*     (2019.01)
    *B29C 48/05*     (2019.01)
    *B29C 48/17*     (2019.01)
    *B29C 48/25*     (2019.01)
    *B29C 48/285*     (2019.01)
    *B29C 48/345*     (2019.01)

(52) U.S. Cl.
    CPC ........ *B29C 48/266* (2019.02); *B29C 48/2888* (2019.02); *B29C 48/30* (2019.02); *B29C 48/304* (2019.02); *B29C 48/345* (2019.02); *B29K 2055/02* (2013.01); *B29L 2009/00* (2013.01); *B33Y 30/00* (2014.12); *B33Y 40/00* (2014.12)

(58) Field of Classification Search
    CPC ... B29C 48/266; B29C 48/2886; B29C 48/30; B29C 48/345; B33Y 30/00; B33Y 40/00
    See application file for complete search history.

(56) References Cited

U.S. PATENT DOCUMENTS

| | | | |
|---|---|---|---|
| 6,129,872 A | 10/2000 | Jang | |
| 6,238,613 B1 | 5/2001 | Batchelder et al. | |
| 6,593,053 B1 | 7/2003 | Chang et al. | |
| 6,773,249 B1 | 8/2004 | Przytulla et al. | |
| 7,604,470 B2 | 10/2009 | LaBossiere et al. | |
| 7,690,908 B2 | 4/2010 | Guillemette et al. | |
| 7,765,949 B2 | 8/2010 | Fork et al. | |
| 7,780,812 B2 | 8/2010 | Fork et al. | |
| 8,801,415 B2 | 8/2014 | Khoshnevis | |
| 8,827,684 B1 | 9/2014 | Schumacher et al. | |
| 9,899,669 B2 | 2/2018 | Cobb | |
| 2003/0111762 A1 | 6/2003 | Floyd et al. | |
| 2004/0141018 A1* | 7/2004 | Silverbrook | B22F 3/008 347/4 |
| 2004/0164436 A1 | 8/2004 | Khoshnevis | |
| 2004/0253365 A1 | 12/2004 | Warren et al. | |
| 2014/0039659 A1 | 2/2014 | Boyer et al. | |
| 2014/0048969 A1 | 2/2014 | Swanson et al. | |
| 2014/0121813 A1 | 5/2014 | Schmehl | |
| 2014/0242208 A1 | 8/2014 | Elsworthy | |
| 2014/0291886 A1 | 10/2014 | Mark et al. | |
| 2014/0328964 A1 | 11/2014 | Mark et al. | |
| 2014/0363532 A1 | 12/2014 | Wolfgram | |
| 2014/0368568 A1 | 12/2014 | Kodama et al. | |
| 2015/0035198 A1 | 2/2015 | Saba | |
| 2015/0056432 A1 | 2/2015 | Solberg | |
| 2015/0077215 A1 | 3/2015 | Ranky et al. | |
| 2015/0093465 A1 | 4/2015 | Page | |
| 2016/0136897 A1 | 5/2016 | Nielsen-Cole et al. | |
| 2016/0325498 A1 | 11/2016 | Gelbart | |
| 2016/0346997 A1 | 12/2016 | Lewis et al. | |

OTHER PUBLICATIONS

Sure Tack Systems; Automatic Adhesive Applicator Equipment; Brochure; 2018; 3 Pages; https://suretacksystems.com/products/automatic-applicators/.

Simplify 3D; Printing with Multiple Extruders; Jul. 23, 2015; 5 Pages; www.simplify3d.com/support/tutorials.

3ders.org; New 3-way extruder and color blending nozzle developed for multi-colour/material 3D printing; 3D Printing Technology; Aug. 25, 2012; 11 Pages; www.3ders.org.

Francis X. Govers III; Diamond Hotend makes multi-color 3D printing possible from a single nozzle; Gizmag; Apr. 12, 2015; 6 Pages; www.gizmag.com.

e3d-online.com; Multi-Extrusion; E3D-Online; 2014; 6 Pages; www.e3d-online.com/Multi-Extrusion.

NScrypt, Inc.; World-wide Leader in Micro to Pico-liter Dispensing Systems with our Patented Micro Dispense Pump; nScrypt, Inc.; 2001-2012; 3 Pages; www.nscrypt.com.

Isaac Budmen; Understanding Shells, Layer Height and Infill; Team Budmen; Sep. 2013; 1 Page; www.blog.teambudmen.com.

* cited by examiner

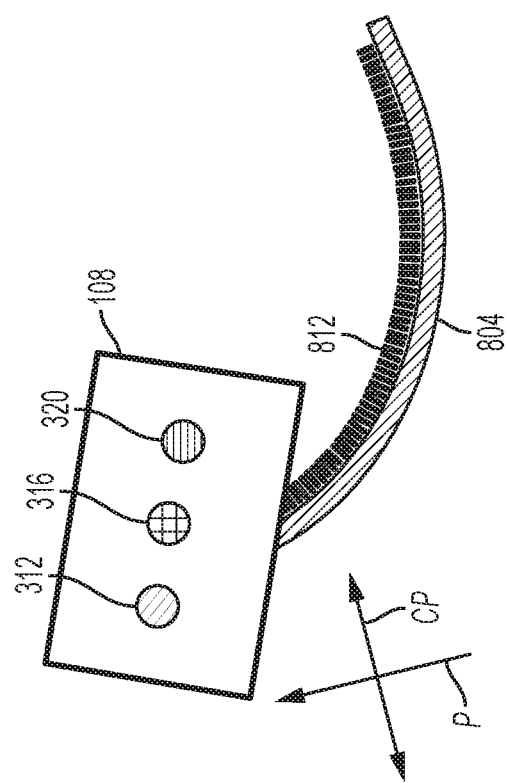
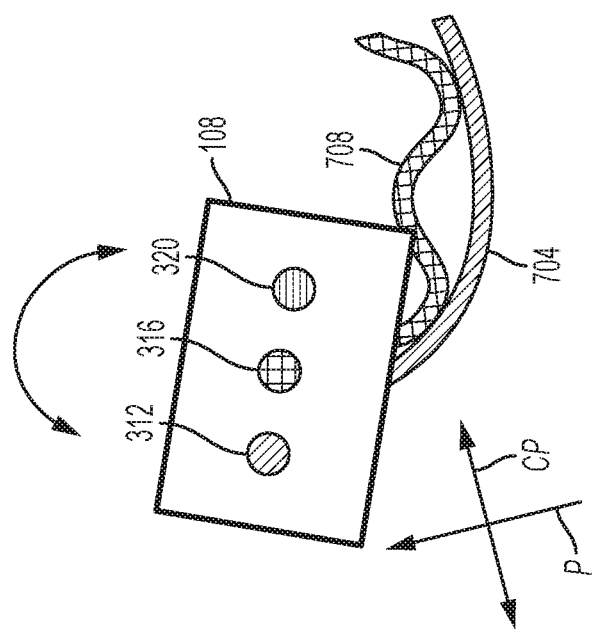
FIG. 8
FIG. 7

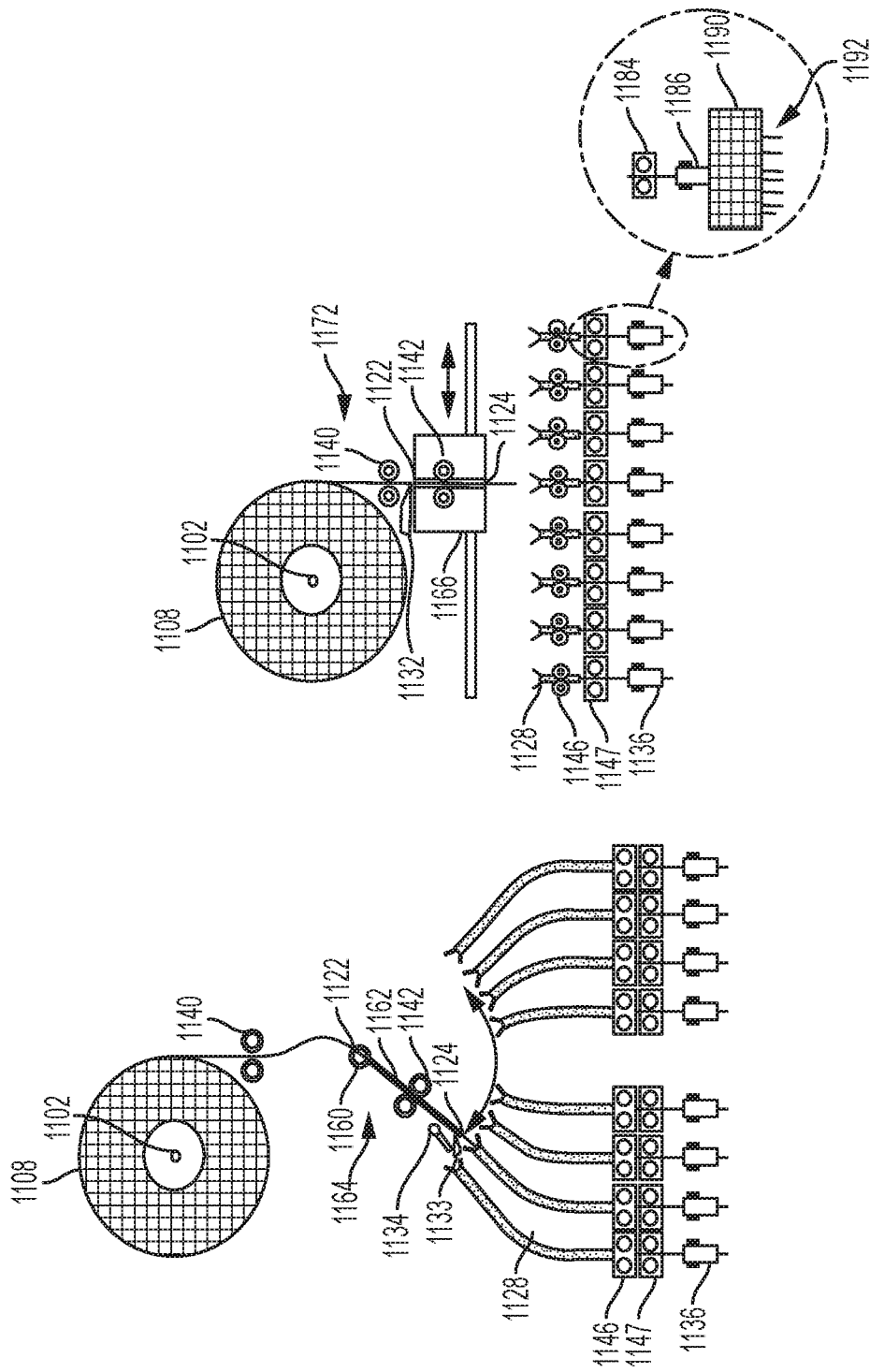

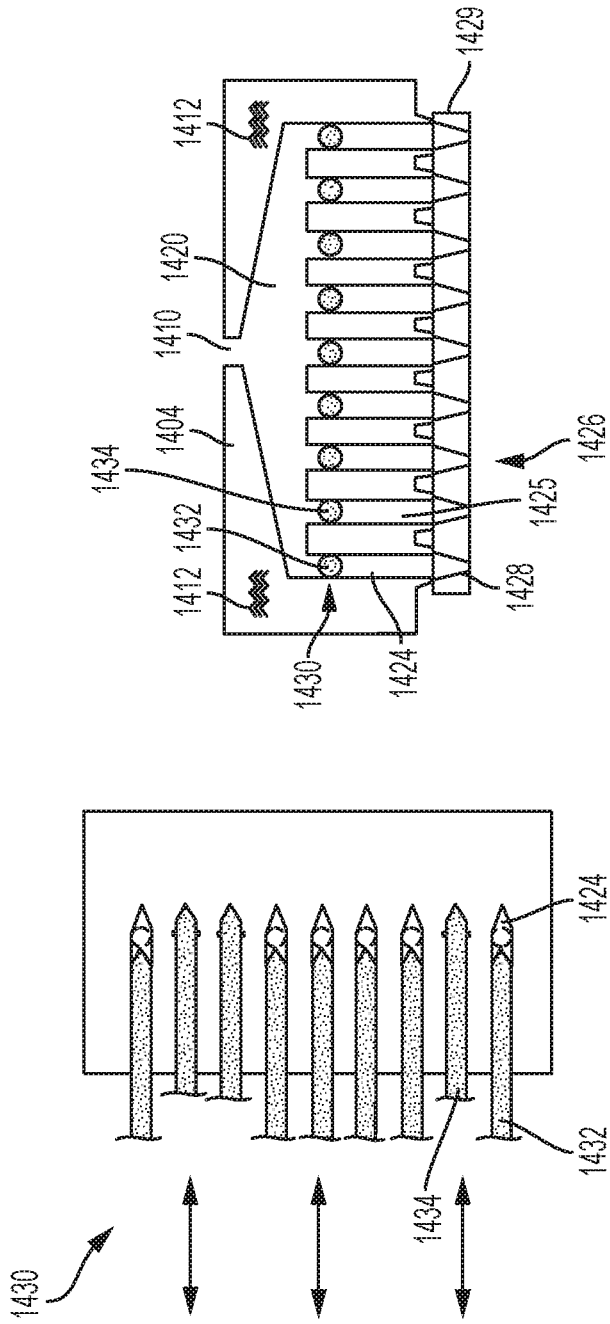

THREE-DIMENSIONAL OBJECT PRINTER WITH MULTI-NOZZLE EXTRUDERS AND DISPENSERS FOR MULTI-NOZZLE EXTRUDERS AND PRINTHEADS

TECHNICAL FIELD

This disclosure is directed to printheads and extruders used in three-dimensional object printers and, more particularly, to extrusion printheads that extrude an extrusion material through two or more nozzles.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extrusion printing in which an extrusion printhead emits a melted build material, such as heated and softened ABS plastic, in a predetermined pattern. The printer typically operates the extrusion printhead to form successive layers of the build material that form a three-dimensional printed object with a variety of shapes and structures. While printing each layer of the three-dimensional printed object, the extrusion printhead emits build material that cools and hardens after extrusion from the printhead to form another layer of the three-dimensional printed object. Three-dimensional printing is sometimes called additive manufacturing and is distinguishable from traditional object-forming techniques, which mostly rely on the removal of material from a work piece by a subtractive process, such as cutting or drilling.

Many existing three-dimensional printers use a single printhead that extrudes material through a single nozzle. The printhead moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form three-dimensional printed object more quickly but loses the ability to emit build material in finer shapes for higher detailed objects while nozzles with narrower diameters can form finer detailed structures but require more time to build the three-dimensional object.

One solution known to the art to increase printer throughput and provide high-resolution printing includes a single printhead with removable nozzles that have multiple diameters for higher throughput or higher precision operations, but such solutions require a unit to switch nozzles and still only provide a single nozzle to emit the build material. Another solution that is known to the art incorporates multiple independent printheads in a single printer. However, the multiple independent printheads increase the complexity of the printer and each printhead requires a separate supply of build material during operation. Furthermore, existing extrusion printheads require activation and deactivation of heaters and drive motors to start and stop the extrusion of build material, which reduces the precision of extruding the build material during operation or reduces the speed at which the printheads form different arrangements of build material. Consequently, improvements to extrusion printheads and methods for the operation of extrusion printheads during three-dimensional object formation processes would be beneficial.

SUMMARY

In one embodiment, a three-dimensional object printer that includes an extrusion material dispenser for a multi-nozzle extruder has been developed. The printer includes a multi-nozzle extruder, a first extrusion material supply configured to store an extrusion material, and a first dispenser. The multi-nozzle extruder includes a plurality of nozzles, each nozzle in the plurality of nozzles being configured to emit an extrusion material and a plurality of channels, each channel in the plurality of channels being connected to one nozzle in the plurality of nozzles and configured to provide the extrusion material to the one nozzle. The first dispenser includes an inlet configured to receive the extrusion material from the first extrusion material supply, an outlet configured to direct the extrusion material received from the first extrusion material supply to one channel in the plurality of channels in the multi-nozzle extruder one channel in the plurality of channels in the multi-nozzle extruder when positioned in alignment with the one channel, and an actuator configured to move the outlet into alignment with at least two channels in the plurality of channels at different times to supply the extrusion material from the first extrusion material supply to at least two channels in the plurality of channels.

In another embodiment, a three-dimensional object printer that includes an extrusion material dispenser for multi-nozzle printheads has been developed. The printer includes a first printhead, a second printhead, and a dispenser. The first printhead includes a first channel configured to receive an extrusion material. The second printhead includes a second channel configured to receive the extrusion material. The dispenser includes an inlet configured to receive the extrusion material from the first extrusion material supply, an outlet configured to direct the extrusion material received from the first extrusion material supply to the first channel in the first printhead or the second channel in the second printhead, and an actuator configured to move the outlet into alignment with each of the first channel and the second channel to supply the extrusion material from the first extrusion material supply to each of the first printhead and the second printhead.

BRIEF DESCRIPTION OF THE DRAWINGS

The foregoing aspects and other features of extrusion printheads and extruders with multiple nozzles are explained in the following description, taken in connection with the accompanying drawings.

FIG. 7 is a diagram of a multi-nozzle extrusion printhead that forms curved arrangements of extrusion material with an oscillating motion to increase the linear length of an arrangement of an inner curve formed by one nozzle to correspond to an outer curve formed by another nozzle.

FIG. 8 is a diagram of a multi-nozzle extrusion printhead that forms curved arrangements of extrusion material with intermittent operation of a nozzle that forms an inner curve to form the inner curve with a similar density of extrusion material as an outer curve formed by another nozzle in the printhead.

FIG. 11C is a schematic diagram of another embodiment of an extrusion material supply and dispenser for a multi-nozzle extruder or a multi-nozzle printhead in a three-dimensional object printer.

FIG. 11D is a schematic diagram of another embodiment of an extrusion material supply and dispenser for a multi-nozzle extruder or a multi-nozzle printhead in a three-dimensional object printer.

FIG. 14B is a cross-sectional view of the printhead in FIG. 14A looking up into the printhead from below the printhead and FIG. 14C is a cross-sectional side view of the printhead in FIG. 14A.

DETAILED DESCRIPTION

Figure 1:
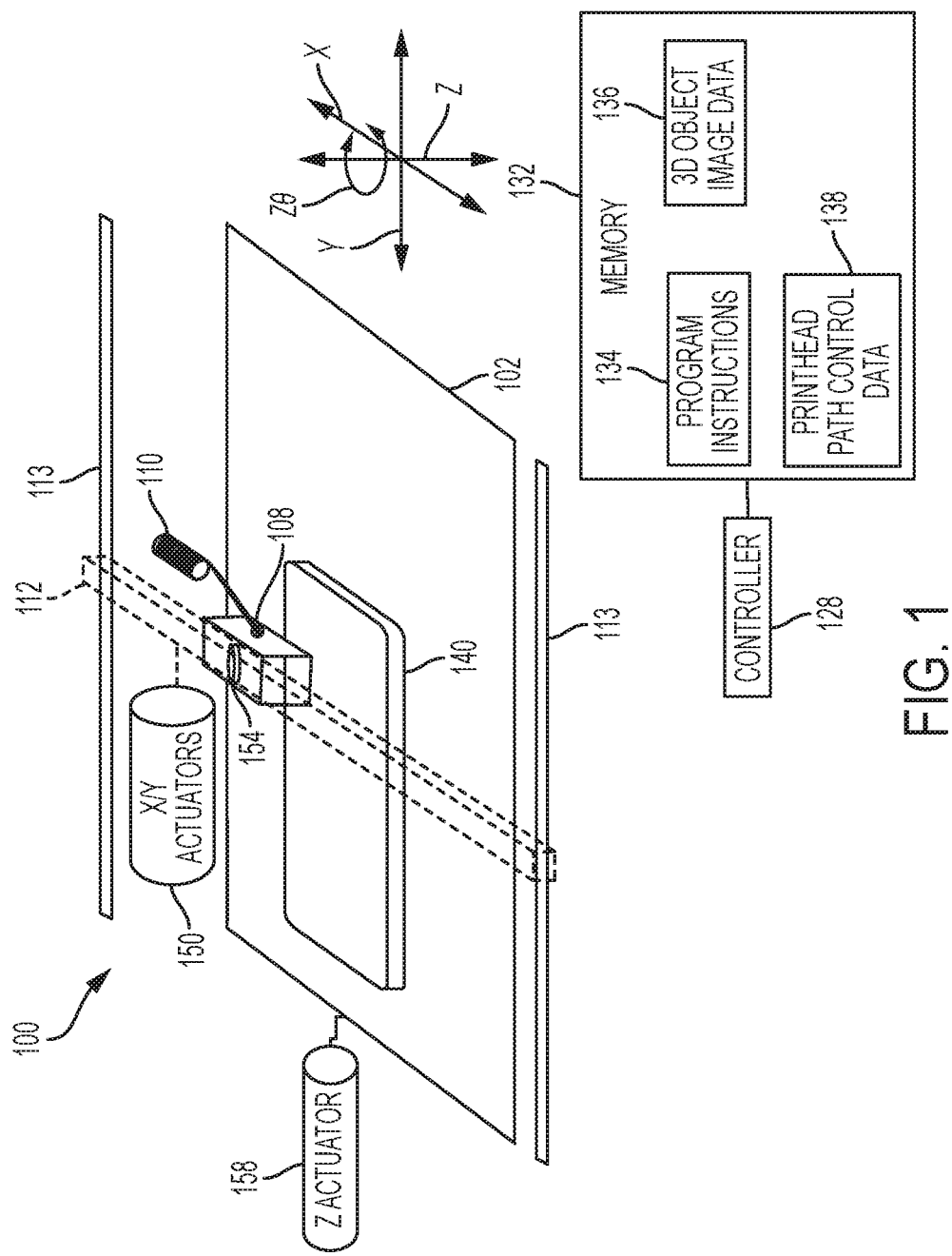
FIG. 1 is a diagram of a three-dimensional object printer that includes a multi-nozzle extrusion printhead.

For a general understanding of the environment for the device disclosed herein as well as the details for the device, reference is made to the drawings. In the drawings, like reference numerals designate like elements.

As used herein, the term "extrusion material" refers to a material that one or more nozzles in an extrusion printhead emit to form layers of material that either form an object or provide structural support for the object during operation of a three-dimensional object printer. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, Acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, other thermoplastics, and any other form of material that is suitable for emission through the nozzles of an extrusion printhead in a liquid or semi-liquid form and then for solidification to form a durable three-dimensional printed object. Examples of support materials include, but are not limited to, high-impact polystyrene (HIPS), polyvinyl alcohol (PVA), and other extrudable materials. In some extrusion printers, the extrusion material is supplied as continuous elongated strand of material that is referred to as a "filament". More generally, the printer receives the extrusion material in a solid phase, such as the solid filament, solid pellets, or a solid granular powder. The extrusion material filament has sufficient flexibility to unwind from a spool or other supply and be supplied to a heater within the printhead. The heater melts the extrusion material filament and a nozzle in the printhead extrudes the extrusion material during a three-dimensional object printing operation. As used herein, the term "melt" as applied to extrusion material refers to any elevation of temperature for the extrusion material that softens the extrusion material to enable extrusion through one or more nozzles in a printhead during operation of a three-dimensional object printer. The melted extrusion material is also referred to as being liquefied to enable extrusion through the nozzles, although those of skill in the art will recognize that certain amorphous extrusion materials do not truly transition to a pure liquid state during operation of the printer.

As used herein, the terms "extrusion printhead" or "printhead" are used interchangeably and refer to a component of a printer that melts extrusion material in a single fluid chamber and provides the melted extrusion material to multiple nozzles in an on-demand manner to form swaths of the extrusion material during a three-dimensional printing operation. As described in more detail below, a valve assembly in the printhead enables the simultaneous operation of multiple nozzles to extrude the extrusion material at different times during the printing operation. Multi-nozzle printheads incorporate two or more nozzles that extrude the extrusion material simultaneously or at different times during a three-dimensional object printing process. As used herein, the term "nozzle" refers to an orifice in an extrusion printhead that extrudes a liquid or semi-liquid extrusion material during a three-dimensional printing operation to form extruded patterns of the extrusion material corresponding to a path of relative movement between the printhead and the image receiving surface. During operation, the nozzle extrudes a substantially continuous linear arrangement of the melted material along the process path of the printhead. The extrusion printhead controls a rate at which the nozzle extrudes the extrusion material and as described in more detail below, the printhead optionally includes valves to activate and deactivate the emission of extrusion material from the nozzle. The diameter of the orifice in the nozzle affects the width of the extruded line of extrusion material. Different printhead embodiments include nozzles having a range of orifice sizes with wider orifices producing wider arrangements of the extrusion material while narrower orifices producing narrower arrangements of the extrusion material. As described in more detail below, some multi-nozzle extrusion printhead embodiments include a plate or other planar member that includes a linear one-dimensional or a two-dimensional arrangement of nozzles. Extrusion printheads that include arrays of multiple nozzles are described in more detail below.

As used herein, the term "pressure chamber" refers to a cavity formed within a housing of a printhead that holds a supply of liquefied extrusion material and supplies the liquefied extrusion material to one or more nozzles in the printhead during a three-dimensional object printing operation. The pressure chamber is further configured to maintain a predetermined level of pressure on the liquid extrusion material to control a rate at which one or more nozzles extrude the extrusion material onto an image receiving surface. In some embodiments, an external feed system for the build material that is connected at an inlet of the pressure chamber supplies liquefied build material under pressure to maintain the predetermined pressure level within the pressure chamber during operation of the printhead. As described in more detail below, because some extrusion printheads include multiple nozzles that are activated and deactivated on an individual basis using valves, the pressure chamber supplies liquefied extrusion material so that any activated nozzles in the printhead extrude extrusion material at a substantially constant rate even as the number of activated nozzles changes during a printing operation.

As used here, the term "multi-nozzle extruder" refers to a device in a printer that emits extrusion material through two or more nozzles that each receive a supply of solid extrusion material. A heater that is coupled to one or more nozzles melts the extrusion material as the extrusion material exits each nozzle. A mechanical controller, such as rollers or an auger, pushes the solid extrusion material into the nozzle to supply the extrusion material during a printing operation. Unlike a printhead, a multi-nozzle extruder does not supply multiple nozzles with extrusion material from a single fluid chamber and does not include a valve assembly to activate and deactivate the operation of individual nozzles.

As used herein, the term "arrangement of extrusion material" refers to any pattern of the extrusion material that the extrusion printhead forms on an image receiving surface during a three-dimensional object printing operation. Common arrangements of extrusion material include straight-line linear arrangements of the extrusion material and curved arrangements of the extrusion material. In some configurations, the printhead extrudes the extrusion material in a continuous manner to form the arrangement with a contiguous mass of the extrusion material while in other configurations the printhead operates in an intermittent manner to form smaller groups of extrusion material that are arranged along a linear or curved path. The three-dimensional object printer forms various structures using combinations of different arrangements of the extrusion material. Additionally, a digital controller in the three-dimensional object printer identifies image data and printhead path data that correspond to different arrangements of the extrusion material prior to operating the extrusion printhead to form each arrangement of the extrusion material. As described below, the controller optionally adjusts the operation of multi-nozzle extrusion printheads to form multiple arrangements of the extrusion material using multiple nozzles during a three-dimensional printing operation.

As used herein, the term "swath" refers to a straight-line or curved linear arrangement of extrusion material that a printhead extrudes onto a region of an image receiving surface within the boundaries of extrusion material that forms an outline around the region. As described in more detail below, a printhead uses two or more extrusion nozzles to form swaths of extrusion material to form one or more layers of extrusion material during a three-dimensional object printing operation.

As used herein, the term "process direction" refers to a direction of relative movement between a printhead and an image receiving surface that receives extrusion material from one or more nozzles in the printhead. The image receiving surface is either a support member that holds a three-dimensional printed object or a surface of the partially formed three-dimensional object during an additive manufacturing process. In the illustrative embodiments described herein, one or more actuators move the printhead in the print zone, but alternative printer embodiments move the support member to produce the relative motion in the process direction while the printhead remains stationary.

As used herein, the term "cross process direction" refers to an axis that is perpendicular to the process direction. The process direction and cross-process direction refer to the relative path of movement of the extrusion printhead and the surface that receives the extrusion material. In some configuration, the printhead includes an array of nozzles that extend along the cross-process direction with a predetermined distance in the cross-process direction between adjacent nozzles in the printhead. As described in more detail below, in some configurations the printer rotates the extrusion printhead to adjust the effect cross-process direction distance that separates different nozzles in the printhead to adjust the corresponding cross-process direction distance that separates arrangements of the extrusion material that are extruded from the nozzles in the printhead.

As described below, an extrusion printhead moves in the process direction along both straight and curved paths relative to a surface that receives extrusion material during the three-dimensional object printing process. Additionally, an actuator in the printer optionally rotates the printhead about the Z axis to adjust the effective cross-process distance that separates nozzles in the printhead to enable the printhead to form two or more arrangements of extrusion material with predetermined distances between each arrangement of the extrusion material. The extrusion printhead moves both along the outer perimeter to form outer walls of a two-dimensional region in a layer of the printed object and within the perimeter to fill all or a portion of the two dimensional region with the extrusion material.

FIG. 1 depicts a three-dimensional object printer 100 that is configured to operate an extrusion printhead to form a three-dimensional printed object 140. The printer 100 includes a support member 102, a multi-nozzle extrusion printhead 108, printhead support arm 112, controller 128, memory 132, X/Y actuators 150, an optional Zθ actuator 154, and a Z actuator 158. In the printer 100, the X/Y actuators 150 move the printhead 108 to different locations in a two-dimensional plane (the "X-Y plane") along the X and Y axes to extruded patterns of the extrusion material that forms one layer in a three-dimensional printed object, such as the object 140 that is depicted in FIG. 1. For example, in FIG. 1 the X/Y actuators 150 translate the support arm 112 and printhead 108 along guide rails 113 to move along the Y axis while the X/Y actuators 150 translate the printhead 108 along the length of the support arm 112 to move the printhead along the X axis. The extruded patterns include both outlines of one or more regions in the layer and extruded swaths of the extrusion material that fill in the regions within the outline of extrusion material patterns. The Z actuator 158 controls the distance between the printhead 108 and the support member 102 along the Z axis to ensure that the nozzles in the printhead 108 remain at a suitable height to extrude extrusion material onto the object 140 as the object is formed during the printing process. The Zθ actuator 154 controls an angle of rotation of the printhead 108 about the Z axis (referenced as Zθ in FIG. 1) for some embodiments of the printhead 108 that rotate about the Z axis to control the separation between nozzles in the printhead 108, although some printhead embodiments do not require rotation during the printing process. As described in more detail below, the angle of rotation of the printhead relative to the process direction affects the distance that separates different sets of extrusion material extruded by multiple nozzles in printhead 108 during a printing operation. In the printer 100, the X/Y actuators 150, Zθ actuator 154, and the Z actuator 158 are embodied as electromechanical actuators, such as electric motors, stepper motors, or any other suitable electromechanical device. In the illustrative embodiment of FIG. 1, the three-dimensional object printer 100 is depicted during formation of a three-dimensional printed object 140 that is formed from a plurality of layers of an extrusion material.

The support member 102 is a planar member, such as a glass plate, polymer plate, or foam surface, which supports the three-dimensional printed object 140 during the printing process. In the embodiment of FIG. 1, the Z actuator 158 also moves the support member 102 in the direction Z away from the printhead 108 after application of each layer of extrusion material to ensure that the printhead 108 maintains a predetermined distance from the upper surface of the object 140. The printhead 108 includes a plurality of nozzles and each nozzle extrudes extrusion material onto the surface of the support member 102 or a surface of a partially formed object, such the object 140. In the example of FIG. 1, the extrusion material supply 110 includes a spool of ABS plastic or another suitable extrusion material filament that unwraps from the spool to supply extrusion material to the printhead 108. In the illustrative embodiment of FIG. 1, the single extrusion material supply 110 provides extrusion material to each of the nozzles in the printhead 108. In different embodiments that are described in more detail below, two or more extrusion material supplies optionally supply different types or colors of extrusion material to selected nozzles in a multi-nozzle printhead.

The support arm 112 includes a support member and one or more actuators that move the printhead 108 during printing operations. In the printer 100, one or more actuators 150 move the support arm 112 and printhead 108 along the X and Y axes during the printing operation. For example, one of the actuators 150 move the support arm 112 and the printhead 108 along the Y axis while another actuator moves the printhead 108 along the length of the support arm 112 to move along the X axis. In the printer 100, the X/Y actuators 150 optionally move the printhead 108 along both the X and Y axes simultaneously along either straight or curved paths. The controller 128 controls the movements of the printhead 108 in both linear and curved paths that enable the nozzles in the printhead 108 to extrude extrusion material onto the support member 102 or onto previously formed layers of the object 140. The controller 128 optionally moves the printhead 108 in a rasterized motion along the X axis or Y axis, but as described below, the X/Y actuators 150 also move the printhead 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the support arm 112, and the movement of the roll 144 from the supply spindle 146 to the uptake spindle 148. The controller 128 is also operatively connected to the printhead 108 to control operation of the plurality nozzles in the printhead 108.

The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of extrusion material that the printer 100 forms during the three-dimensional object printing process. The printhead path control data 138 include a set of geometric data or actuator control commands that the controller 128 processes to control the path of movement of the printhead 108 using the X/Y actuators 150 and to control the orientation of the printhead 108 using the Zθ actuator 154. The controller 128 operates the actuators to move the printhead 108 and activates and deactivates different nozzles in the printhead 108 to form arrangements of the extrusion material in each layer of the three-dimensional printed object 140.

Figure 2A:
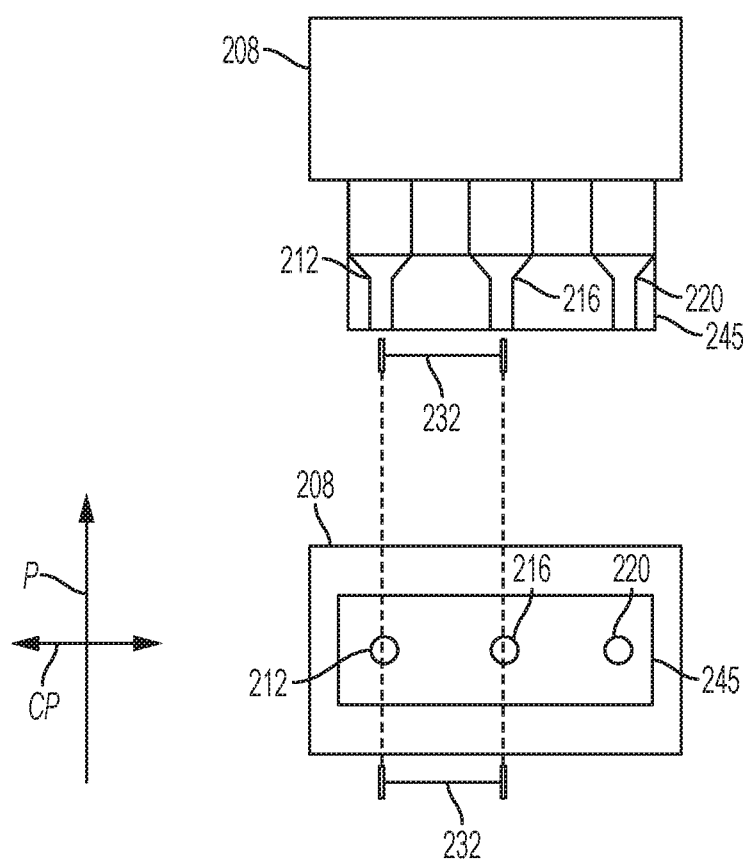
FIG. 2A is a diagram of a multi-nozzle extrusion printhead in a first orientation.
Figure 2B:
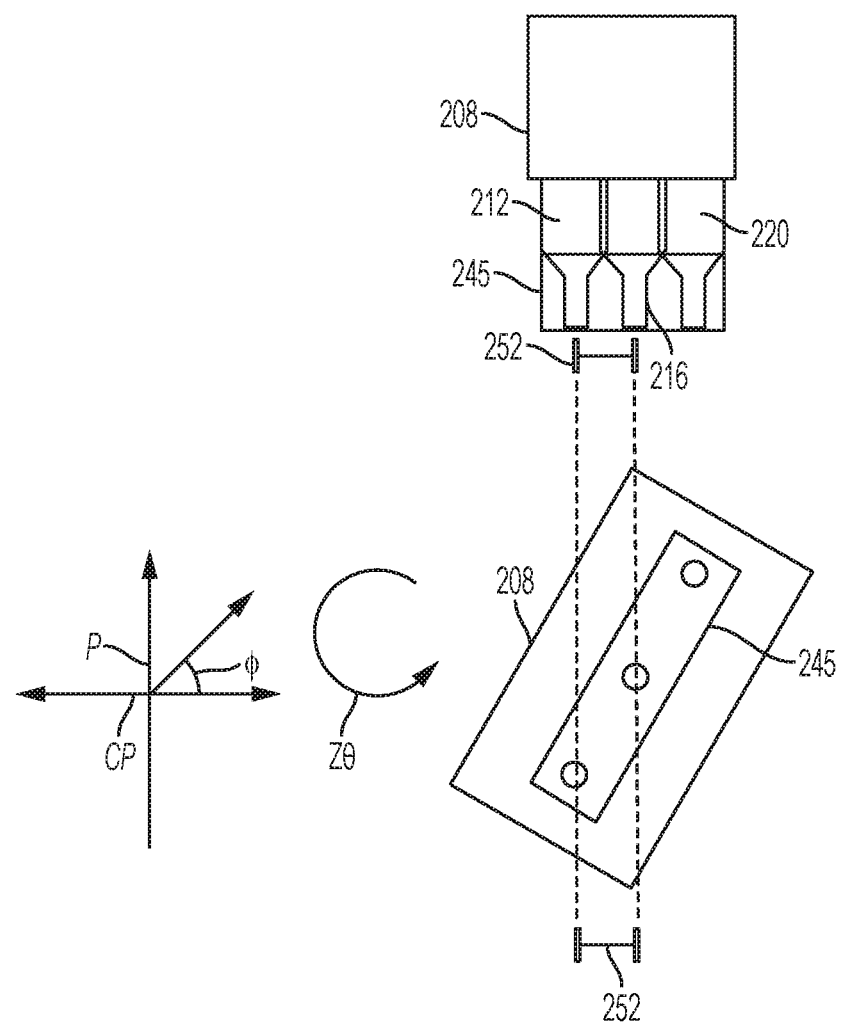
FIG. 2B is a diagram of the multi-nozzle extrusion printhead of FIG. 2A in a second orientation.

FIG. 2A and FIG. 2B depict one embodiment of a multi-nozzle extrusion printhead 208. The printhead 208 includes three (3) extrusion nozzles 212, 216, and 220 that each extrudes extrusion material during operation. A single fluid chamber and valve assembly (not shown) control the flow of extrusion material through the nozzles 212, 216, and 220 during operation of the printhead 208. In the printhead 208, the nozzles 212, 216, and 220 each form an opening through a planar member 245, which forms a printhead face with a uniform surface. As described in more detail below, in some embodiments the printhead 208 includes valves that enable the printhead 208 to control extrusion of the extrusion material from the nozzles 212-220 in a selective manner. In the printer 100, the controller 128 is operatively connected to the printhead 208 to operate one or more of the nozzles 212-220 during a three-dimensional object printing process.

In the printhead 208, the nozzles 212-220 are arranged linearly with a predetermined separation distance between adjacent nozzles along the cross-process direction axis CP. FIG. 2A depicts the printhead 208 in a configuration where the printhead 208 moves along the process direction P with the maximum cross-process direction separation between adjacent nozzles in the printhead 208. In FIG. 2A, the dimension line 232 depicts the cross-process direction separation between the nozzles 212 and 216. In the configuration of FIG. 2A, adjacent nozzles in the printhead 208 form extruded arrangements of the extrusion material with a gap between the arrangements that corresponds to the separation between the nozzles in the cross-process direction.

FIG. 2B depicts the printhead 208 in another orientation that changes the cross-process direction distance between the nozzles from the orientation of FIG. 2A. In FIG. 2B, the printhead 208 is rotated about the Z axis as depicted by the rotation Zθ to adjust the relative positions of the nozzles 212-220 along the cross-process direction CP. In the printer 100, the controller 128 operates the actuator 154 to rotate the printhead 108 about the Zθ axis to adjust the cross-process direction separation between nozzles. Since the process direction P refers to the relative direction of movement of the printhead relative and the image receiving surface, such as the support member 102 or upper surface of the three-dimensional printed object 140, the relative separation between nozzles in the cross-process direction is affected by both the orientation and relative direction of movement of the printhead. Referring again to FIG. 2B, the printhead 208 is rotated relative to the process direction axis CP. In FIG. 2B, a narrower cross-process direction distance 252 separates the nozzles 212 and 216 in comparison to the orientation of FIG. 2A.

FIG. 2A and FIG. 2B depict two orientations of the printhead 208. More generally, the distance between any two nozzles in the printhead 208 when moving in the process direction is expressed using the following equation: $D_{CP}=M(\cos(\phi))$, where M is maximum cross-process direction separation between the two nozzles, which is a physical parameter of the sizes and arrangements of the nozzles in the printhead, and $\phi$ refers to a rotational angle about the Z axis relative to the process direction axis. ($\phi=0$) and process direction axis ($\phi=\frac{1}{2}\pi$) although the printhead may rotate to other angles as well.

As described above, the multi-nozzle printhead 108 in the printer 100 receives extrusion material from a single extrusion material supply 110. An extrusion material dispenser that is located within the printhead 108 or external to the printhead 108 in the three-dimensional object printer 100 provides the extrusion material from the extrusion material supply 110 to the nozzles in the printhead 108 during operation of the printer 100.

Figure 11B:
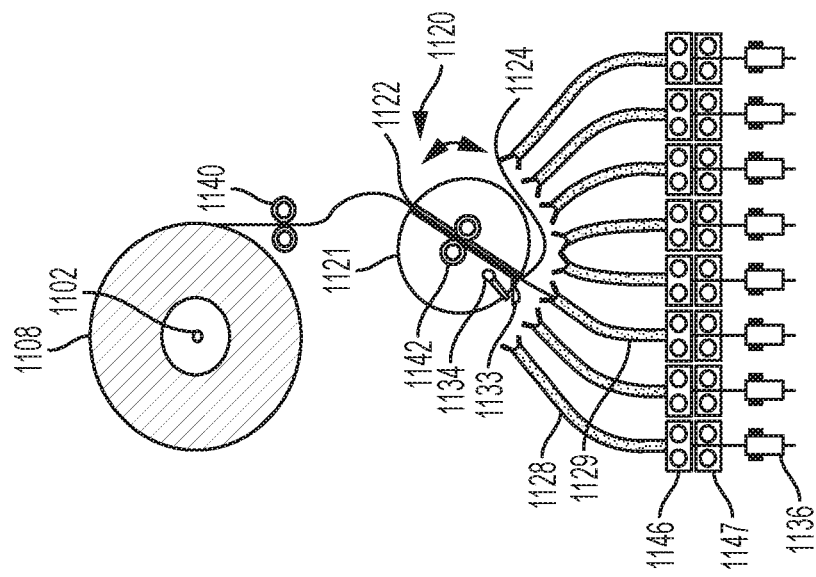
FIG. 11B is a schematic diagram of another embodiment of an extrusion material supply and dispenser for a multi-nozzle extruder or a multi-nozzle printhead in a three-dimensional object printer.
Figure 11A:
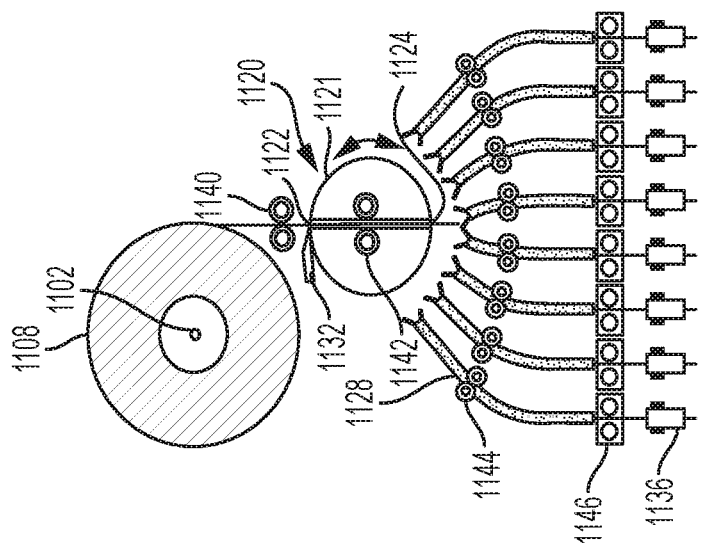
FIG. 11A is a schematic diagram of an extrusion material supply and dispensers for a multi-nozzle extruder or a multi-nozzle printhead in a three-dimensional object printer.

FIG. 11A depicts one embodiment of an extrusion material dispenser 1120 that receives a filament of extrusion material 1108 from a spool 1102 in an extrusion material supply. The dispenser 1120 supplies extrusion material to either multiple channels that supply different nozzles in a multi-nozzle extruder, which is depicted in FIG. 11A, or supplies the extrusion material to a single fluid chamber in a printhead, which is depicted in more detail in the embodiment of FIG. 11D depicted below. In FIG. 11A, the dispenser 1120 includes guide rollers 1140 that receive the extrusion material filament and a disc 1121 or other rotating member with an inlet opening 1122 that receives the filament of extrusion material and an outlet opening 1124 that dispenses the extrusion material. The dispenser 1120 also includes guide rollers 1142 between the inlet 1122 and outlet 1124 and a fixed position cutter 1132. The guide rollers 1140 and 1142 are operatively connected to actuators that control the movement of the filament 1108 from the extrusion material supply 1102 through the dispenser 1120 and to different channels in the multi-nozzle extruder at different times.

The dispenser 1120 provides extrusion material to the channels that are located in the multi-nozzle extruder and supply portions of the filament to the individual nozzles in the multi-nozzle extruder, such as the nozzle 1136. The outlet opening 1124 is aligned with one channel at a time to provide a portion of the filament to the one channel. An actuator in the dispenser moves the outlet 1124 into alignment with different channels at different times to provide different segments of the filament from a single extrusion material supply to two or more nozzles in the multi-nozzle extruder using two or more of the channels. For example, the channel 1128 receives a portion of the extrusion material filament and provides the filament to the nozzle 1136, and the dispenser moves the outlet 1124 into alignment with other channels to supply the extrusion material to different nozzles. Note that to simplify the diagrams in FIGS. 11A through 12B, the guide channels 1128 are shown stopping when they reach the rollers 1146, however the guide channels 1128 extend past rollers 1146 and 1147 and engage the melters 1136 in some dispenser embodiments.

In FIG. 11A, rollers 1144 and 1146 control the movement of the filament through the channel 1128 to the nozzle 1136. In FIG. 11A, each of the nozzles includes a heater that melts the extrusion material in the filament near the outlet of each nozzle for extrusion of the melted extrusion material onto an image receiving surface, although in other embodiments a single heater melts the extrusion material for each of the nozzles in the multi-nozzle extruder.

During operation, the extrusion material supply provides a predetermined length of the extrusion material filament 1108 to the dispenser 1120. For example, in one configuration the disc 1121 receives a length of the filament that extends from the inlet 1122 to the outlet 1124. An actuator in the dispenser rotates the disc 1121 to move the filament into contact with the cutter 1132, which occupies a fixed position in the embodiment of FIG. 11A. The cutter 1132 separates the portion of the filament that is within the disc 1121 from the remaining portion of the filament 1108 in the extrusion material supply. In some configurations, the rotation of the disk 1121 drives the filament against the stationary blade in the cutter 1132 to cut the filament. The actuator then rotates the disc 1121 to align the filament at the outlet 1124 with one of the channels corresponding to one nozzle in the multi-nozzle extruder. For example, in FIG. 11A the disc 1121 rotates the outlet 1124 to align the portion of the cut filament with the opening of the channel 1128. The rollers 1142 in the disc 1121 rotate to move the cut portion of the filament into the channel 1128 where the rollers 1144 and 1146 engage the filament to control the movement of the filament to the nozzle 1136. In the dispenser 1120, the actuator returns the inlet 1122 in the disc 1121 to alignment with the free end of the filament at the rollers 1140 to receive additional filament for another channel and nozzle in the multi-nozzle extruder. In another embodiment, the dispenser optionally receives different types of build material from two or more extrusion material supplies. The actuator moves the inlet 122 on the disc 1121 into alignment with the outlets of different extrusion material supplies to receive segments of the extrusion materials from more than one supply at different times during operation of the dispenser 1120. During operation, the controller 128 operates the dispenser 1120 to maintain a supply of the extrusion material from one or more of the extrusion material supplies for each of the nozzles in the multi-nozzle extruder.

FIG. 11B depicts another configuration of the dispenser 1120. In FIG. 11B, the dispenser 1120 includes a cutter 1133 that is mounted to the disc 1121 proximate to the outlet 1124. An actuator 1134 moves the cutter 1133 to cut the filament after the dispenser 1120 moves a predetermined length of the filament through the outlet 1124 and into one of the channels, such as channels 1128 and 1129 in FIG. 11B. Rollers in each of the channels, such as rollers 1146 and 1147, receive the filament from the dispenser 1120 and control the movement of the filament to the corresponding nozzle in the multi-nozzle extruder. In the configuration of FIG. 11B, the filament remains in a conduit within the disc 1121 after the cutter 1133 separates a portion of the filament that is provided to each nozzle from the remaining portion of the filament 1108.

FIG. 11C depicts another embodiment of a dispenser 1164. The dispenser 1164 includes a pivoting member 1122 that pivots a conduit 1162 with an inlet 1122 and outlet 1124 to align the outlet 1124 with the channels in the multi-nozzle extruder that provide the filament to the nozzles in the multi-nozzle extruder. During operation, the pivoting member 1122 moves the outlet of the conduit 1162 into alignment with an opening of one of the channels and the dispenser 1164 moves the filament 1108 from the supply 1102 to the channel to provide extrusion material to one of the nozzles in the multi-nozzle extruder. The actuator 1134 operates the cutter 1133 to separate the filament that has been supplied to the channel of the multi-nozzle extruder from the remaining filament in the supply and the dispenser continues operation to provide the extrusion material to the channels for each of the nozzles in the multi-nozzle extruder. In FIG. 11C, the rollers 1140 and 1142 control the movement of the extrusion material filament 1108 through the dispenser 1164. The rollers in the multi-nozzle extruder, such as roller 1146 and 1147, control the movement of the filament through the channel to the corresponding nozzle, such as channel 1128 and nozzle 1136, respectively.

FIG. 11D depicts another embodiment of a dispenser 1172. In FIG. 11D, the dispenser 1172 includes a moving member 1166 with an inlet 1122, outlet 1124, and guide rollers 1142. An actuator in the dispenser 1172 moves the member 1166 along a linear path to align the inlet 1122 with the filament 1108 from the extrusion material supply 1102 that passes through the guide rollers 1140. The actuator also moves the member 1166 along the linear path to align the outlet 1124 with the openings in each of the plurality of channels, such as the channel 1128 that provides the filament to the nozzle 1136. The dispenser 1172 includes a cutter 1132 that is located at a fixed position. The member 1166 receives a portion of the filament 1108 and the actuator moves the member 1166 and filament into contact with the cutter 1132 to separate the portion of the filament in the member 1166 from the remaining portion of the filament in the extrusion material supply 1102.

Figure 12B:
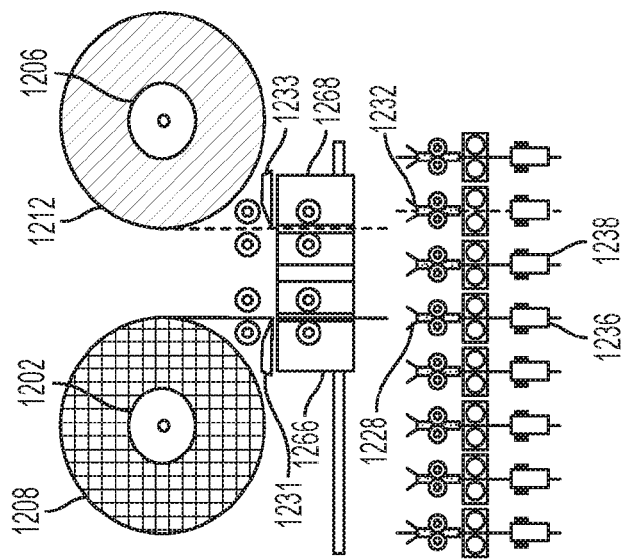
FIG. 12B is a schematic diagram of another embodiment of multiple extrusion material supply and dispensers that supply multiple extrusion materials to different nozzles of a multi-nozzle extruder or multi-nozzle printheads in a three-dimensional object printer.
Figure 12A:
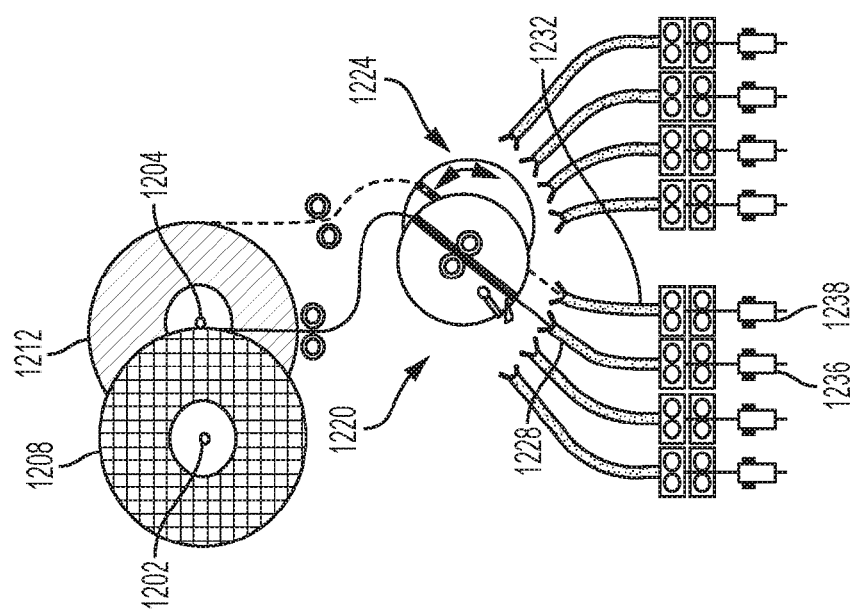
FIG. 12A is a schematic diagram of multiple extrusion material supply and dispensers that supply multiple extrusion materials to different nozzles of a multi-nozzle extruder or multi-nozzle printheads in a three-dimensional object printer.

FIG. 12A depicts two dispensers that provide two different types of extrusion material to different nozzles in a single multi-nozzle extruder. FIG. 12A includes dispensers 1120 and 1124. The dispenser 1120 receives a first extrusion material 1208 from a first extrusion material supply 1202 and the dispenser 1224 receives a second extrusion material 1212 from a second extrusion material supply 1204. Each of the dispensers 1220 and 1120 is similar in configuration to the dispenser 1120 of FIG. 11B, although alternative configurations include two or more dispensers from any of the embodiments in FIG. 11A-FIG. 11D. During operation, the first dispenser 1220 supplies the first extrusion material to a first portion of the channels and corresponding nozzles in the multi-nozzle extruder, such as the channel 1228 and nozzle 1236 in the example of FIG. 12B. Heaters in the multi-nozzle extruder melt the extrusion material as the extrusion material approaches the nozzles and one or more of the activated nozzles extrudes the melted extrusion material onto an image receiving surface. The second dispenser 1224 supplies the second extrusion material 1212 from the second extrusion material supply 1212 to a second portion of the channels and nozzles in the multi-nozzle extruder, such as channel 1232 and nozzle 1238.

FIG. 12B depicts another embodiment of multiple dispensers that supply two types of extrusion material to nozzles in a multi-nozzle extruder. In FIG. 12B, two dispensers 1266 and 1268 are formed from a single member that moves linearly along a predetermined path to receive two types of extrusion material from the extrusion material supplies 1202 and 1206, respectively. During operation, the dispenser 1266 receives a portion of the extrusion material 1208 from the extrusion material supply 1202 and the dispenser 1268 receives a portion of the extrusion material 1212 from the extrusion material supply 1206. An actuator moves the dispensers 1266 and 1268 in two linear directions to cut the filament of extrusion material 1208 with the cutter 1231 and cut the filament of extrusion material 1212 with the cutter 1233. The dispensers 1266 and 1268 then move to align the filaments of extrusion material with the channels that are associated with different portions of the nozzles in the extrusion multi-nozzle extruder. For example, in FIG. 12B the dispenser 1266 moves the filament into alignment with the channel 1228 and the nozzle 1236 to dispense the filament of the extrusion material 1208. The actuator moves the dispensers 1266 and 1268 along the linear path to align the dispenser 1268 into alignment with the channel 1232 and nozzle 1238 to dispense the filament of the extrusion material 1212. The embodiment of FIG. 12B includes the two dispensers 1266 and 1268 that are otherwise similar to the dispenser 1172 of FIG. 11D. In alternative embodiments, a single dispenser receives extrusion material from two or more spools and dispenses the different extrusion materials to selected channels for different nozzles in the multi-nozzle extruder. Additionally, a single rotational dispenser optionally receives material from a plurality of material spools by simply stopping at the appropriate location and then distributes the material to a plurality of channels and melters.

The embodiments of FIG. 12A and FIG. 12B enable a three-dimensional object printer to supply multiple types of extrusion material to different nozzles in a single multi-nozzle extruder. For example, some three-dimensional printed objects are formed using multiple colors of extrusion material, and the dispenser configurations of FIG. 12A and FIG. 12B enable a first portion of the nozzles to extrude the extrusion material with the first color and a second portion of the nozzles to extrude the extrusion material with the second color to form a multi-color object. In other embodiments, the three-dimensional object printer uses two different types of extrusion materials to form different structures in the three-dimensional printed object, and the dispensers provide different types of extrusion material to selected nozzles to enable a single extrusion multi-nozzle extruder to form the object using multiple types of extrusion material.

In one configuration, each dispenser provides one type of extrusion material to one-half of the available nozzles in the multi-nozzle extruder for printing operations that use approximately equal amounts of the extrusion material. However, in other configurations the dispensers provide one type of extrusion material to a larger portion of the nozzles while one nozzle or a smaller number of nozzles receive the second type of extrusion material. For example, in one configuration the dispensers provide an extrusion material that forms most of the interior volume of an object to most of the nozzles in the multi-nozzle extruder while a smaller number of nozzles receive another type of extrusion material that forms portions of the exterior of the object. Additionally, after a nozzle has exhausted a supply of one type of extrusion material in the corresponding channel, the dispensers optionally provide a different type of extrusion material to the channel to enable one nozzle to extrude different types of extrusion material at different times during a three-dimensional object printing operation.

While FIGS. 11A-11D and FIG. 12A-12B depict extrusion material dispensers that use various sets of rollers to control the movement of the filament, these illustrations are merely examples of some configurations of rollers. Alternative embodiments include one or more sets of guide rollers that control the movement of filaments through channels to the nozzles. In particular, the dispensers cut the filaments of extrusion material with minimum lengths and arrange the rollers to ensure that the filaments do not become lodged within the channels in the dispenser or a multi-nozzle extruder.

While FIGS. 12A and 12B depict dispensers that supply two different extrusion materials to nozzles in one or more multi-nozzle extruders, other embodiments include additional dispensers and extrusion material supplies to provide three or more types of extrusion material to a multi-nozzle extruder. Three-dimensional objects printers incorporate multi-nozzle extruders in a similar manner to the printhead 108 depicted in FIG. 1 to form patterns of the extrusion material on an image receiving surface. Additionally, the dispensers described herein are also capable of providing extrusion material to a heater and pressure chamber assembly that supply liquefied extrusion material to a plurality of nozzles in an extrusion printhead. As depicted in FIG. 11D, the dispenser 1172 alternatively provides the extrusion material to rollers 1184 and melter assembly 1186 to supply extrusion material to a pressure chamber 1190 for one or more nozzles 1192 in an extrusion printhead. The dispenser 1172 provides the extrusion material to two or more printheads within a three-dimensional object printer. Each of the printheads includes an inlet with the rollers 1184 and heaters 1186 that receive the extrusion material from the outlet 1124 of the dispenser 1172 or the corresponding outlets of any of the other dispensers described herein. During operation, the dispenser provides portions of the extrusion material filament 1108 to the inlets of different printheads, such as to a first printhead and a second printhead in a configuration of a printer that includes two printheads. The configuration depicted in FIG. 11D is also suitable for use with any of the other dispenser embodiments that are disclosed herein in FIG. 11A-FIG. 11D and FIG. 12A-12B.

Figure 13A:
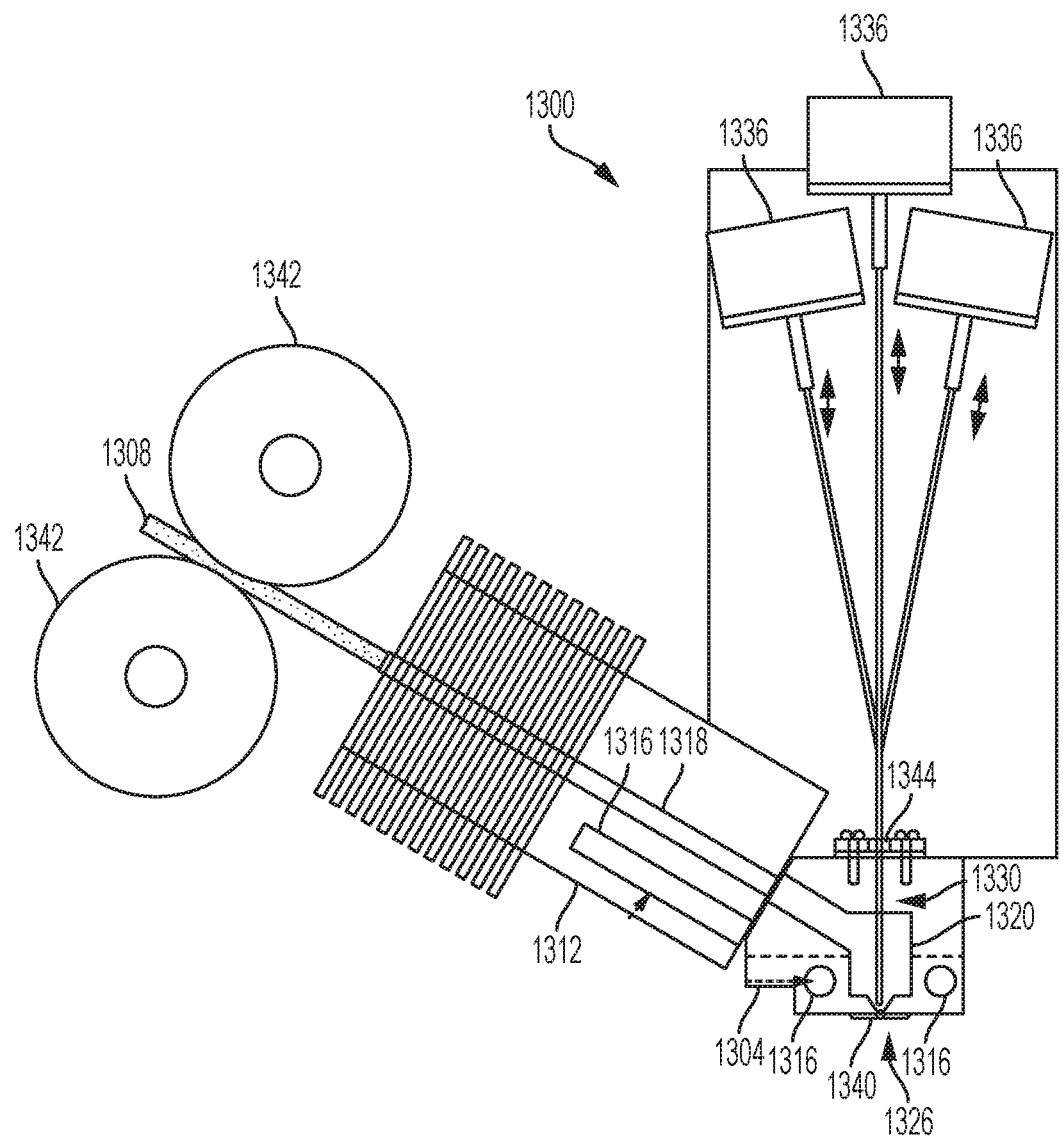
FIG. 13A is a schematic diagram of a multi-nozzle extrusion printhead that includes a chamber to store melted extrusion material and provide the melted extrusion material to one or more outlets with valves that control the extrusion of the melted extrusion material during a three-dimensional object printing operation.
Figure 13B:
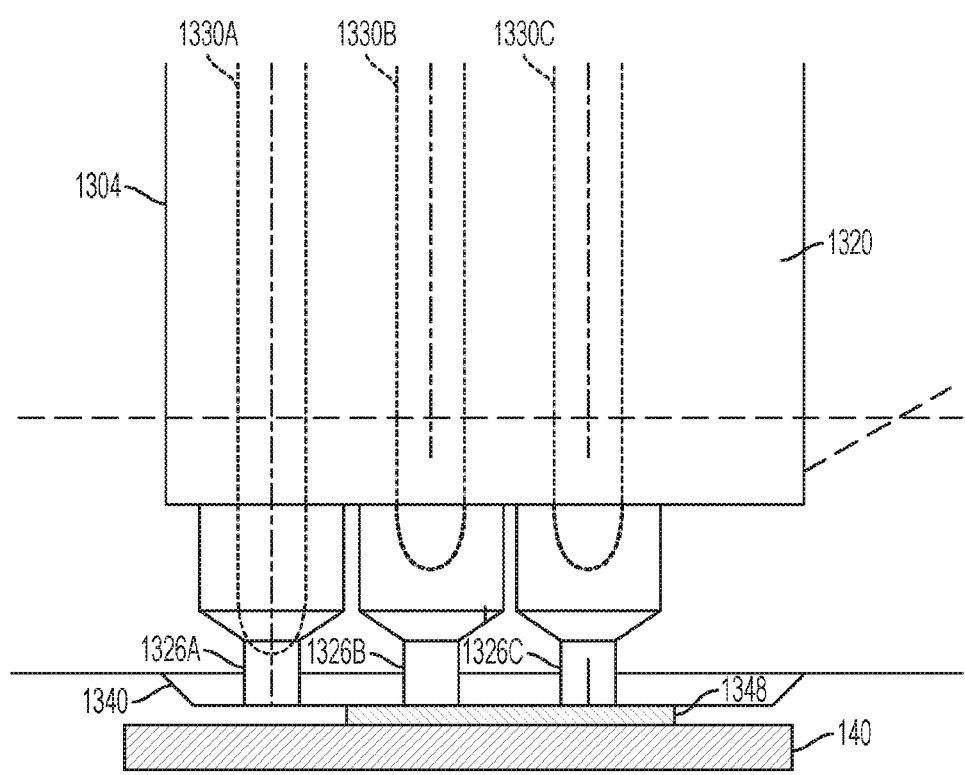
FIG. 13B is another schematic diagram of nozzles in the extrusion printhead of FIG. 13A depicting opened and closed valves for different nozzles in a single extrusion printhead.

FIG. 13A and FIG. 13B depict an embodiment of an extrusion printhead 1300 that includes a pressure chamber and at least one valve to control the extrusion of liquefied extrusion material through one or more nozzles. The printhead 1300 is one embodiment of the printhead 108 that is suitable for use in the printer 100 and other three-dimensional object printers that employ extrusion printheads. The printhead 1300 includes a melter assembly 1312 that melts an extrusion material filament 1308 fed to the melter assembly 1312 via drive rollers 1342, a housing 1304 that includes a pressure chamber 1320, at least one nozzle 1326, at least one valve member 1330, a valve seal 1344, and at least one actuator 1336.

In the embodiment of FIG. 13A, the melter assembly 1312 is formed from stainless steel and includes one or more heating elements 1316, such as electrically resistive heating elements, that melt the filament of extrusion material 1308 in a fluid channel 1318. The melter assembly 1312 receives extrusion material in a solid phase, such as the solid filament 1308 or, in alternative embodiments, solid phase powdered or pelletized extrusion material. The melter assembly 1312 controls the movement of the solid phase extrusion material through the channel to supply the extrusion material to the heaters 1316 that melt the extrusion material and supply melted extrusion material to the pressure chamber 1320. A portion of the extrusion material that remains solid in the fluid channel 1318 proximate to the inlet by the drive rollers 1342 forms a seal in the fluid channel 1318 that prevents liquefied extrusion material from exiting the melter assembly from any other opening than the connection to the pressure chamber 1320. In the example of FIG. 13A, the drive rollers 1342 move portions of the extrusion material 1308 into the melter assembly 1312 to maintain a supply of the extrusion material in the pressure chamber 1320. The fluid channel 1318 is fluidly coupled to the pressure chamber 1320 that is formed in the housing 1304. The pressure chamber 1320 receives the melted extrusion material and additional heating elements 1316 in the housing 1304 maintain an elevated temperature within the pressure chamber 1320 to keep the extrusion material in a liquefied state within the housing 1304. In some embodiments a thermal insulator covers portions of the exterior of the housing 1304 to maintain a temperature within the pressure chamber 1320.

While FIG. 13A depicts a feed system that uses an electromechanical actuator and the driver rollers 1342 to control the movement of the filament 1308 into the melter assembly 1312, alternative embodiments use one or more actuators to operate a rotating auger or screw to control the movement of the solid phase extrusion material into the melter assembly where the extrusion material melts and flows into the pressure chamber. For example, a rotating auger or screw moves solid phase extrusion materials such as powders or pellets of the extrusion material into the melter channel 1318. More generally, the melter assembly 1312 includes a mechanical drive member that controls the movement of the extrusion material and one or more actuators, such as electric motors, that operate the drive member to move the extrusion material and maintain a supply of the extrusion material in the printhead.

To maintain a predetermined level of fluid pressure within the pressure chamber 1320, the controller 128 adjusts the feed rate to maintain a supply of the melted extrusion material in the pressure chamber 1320. In some configurations, the controller adjusts the feed rate based on either the number of valves in the valve assembly 1326 that are opened to enable extrusion of the extrusion material or on a fluid pressure level sensed within the pressure chamber 1320. In another embodiment, a DC electric motor controls the rotation of the drive rollers 1342, and the controller 128 adjusts the level of electrical current supplied to the DC motor to maintain a level of torque for the motor and rollers at a pre-defined level during material extrusion. The operation of the DC motor at a substantially constant level of torque provides a controlled level of pressure within the pressure chamber and provides automatic compensation for variations in the number of open nozzles in the system.

In the printhead 1300, the pressure chamber 1320 is fluidly coupled to one or more outlet nozzles 1326. In the illustrative embodiment of FIG. 13A and FIG. 13B, the nozzles 1326 are directly coupled to the pressure chamber 1320, although alternative embodiments optionally include a longer fluid path between the pressure chamber and nozzle outlets. To control the extrusion of the extrusion material, the controller 128 operates the valve actuators 1336 and valve members 1330 to open and close the nozzles 1326. In printhead 1300, the valve seal 1344 enables the valve members 1330 to pass through an exterior wall of the pressure chamber 1320 and to move within the pressure chamber 1320 while preventing any liquefied extrusion material from exiting the pressure chamber 1320 through any opening other than the nozzles 1326.

During operation of the printhead 1300, liquefied extrusion material from the pressure chamber 1320 extrudes through any of the nozzle outlets 1326 when the outlets are fluidly coupled to the pressure chamber 1320 and are not blocked by one of the valve members 1330. Each of the valve members 1330 is, for example, an elongated aluminum or steel pin with a rounded or chamfered end that conforms to a shape and size of a fluid opening between the pressure chamber 1320 and a corresponding nozzle 1326 in the printhead 1300. Each valve member 1330 is aligned with a single nozzle 1326 in the printhead 1300. The actuators 1336 move the valve members 1330 to open and close the fluid paths through the nozzles 1326 to control the extrusion of extrusion material from the printhead 1300. In the printhead 1300, the electromechanical actuators 1336 are electromagnetic actuators that move the valve members 1330 via an electromagnetic force in response to an electric current, while in another embodiment the electromechanical actuator is a piezo-electric actuator that generates a mechanical force to move the member in response to an electric current. In the printhead 1300, the electromechanical actuators 1330 are located outside of the pressure chamber 1320 and are thermally isolated from the pressure chamber 1320 and melter assembly 1312. The actuators 1336 operate at a lower temperature than the pressure chamber 1320 and melter assemble 1312 that improves the reliability and operating life of the actuators, while the elongated valve members 1330 extend into the higher-temperature regions of the printhead 1300 through the valve seal 1344. The actuators 1336 move the valve members 1330 between at least two positions within the pressure chamber 1320. In a first position, the valve member 1330 blocks a flow of the extrusion material through the corresponding nozzle 1326 to block the flow of extrusion material and effectively "deactivate" the nozzle.

FIG. 13B depicts a selection of nozzles and valve members in the printhead 1300. In FIG. 13B, the valve member 1330A is located in a first position where the valve member 1330A engages the fluid opening between the pressure chamber 1320 and the nozzles 1326A. The valve members 1330B and 1330C are each located in a second position within the pressure chamber 1320 and these valve members are removed from the fluid openings of the nozzles 1326B and 1326C, respectively. The pressurized melted extrusion material in the pressure chamber 1320 flows through the outlets and corresponding nozzles 1326B and 1326C during a printing operation while the valve members 1330A and 1330B remain in the second position of FIG. 13B. During a printing operation, the actuators 1336 move the valve members 1330, including the valve members 1330A-1330C, between the respective first and second positions to either disable or enable the extrusion of extrusion material through selected nozzles in the printhead 1330. In the printer 100, the controller 128 operates the actuators 1336 to control the extrusion of extrusion material during a printing operation. The controller 128 controls the actuators 1336 to form arrangements of the extrusion material using all or a selected portion of the nozzles in the printhead 1330 as the printhead 1330 moves in the process direction to form each layer of a three-dimensional printed object.

The nozzle array 1326 includes the nozzle openings that are formed through a planar member 1340. In the embodiment of FIG. 13A and FIG. 13B, the planar member 1340 is a metallic plate with an external surface that is optionally coated with a low-surface energy material such as polytetrafluoroethylene. In other embodiments the planar member 1340 is formed from a portion of the housing 1304 and alternative embodiments form the member from ceramic or another material with suitable mechanical and thermal properties. The planar member 1340 provides a smooth surface through which the activated nozzles 1326 extrude the extrusion material during the printing operation. In other embodiments, the planar member includes grooves or other features formed between the nozzles or each of the nozzles is formed through a separate raised planar member. The planar member 1340 also receives some of the heat from the heaters 1316 in the printhead housing 1304.

In some operating modes, the printhead 1300 is positioned in close proximity to the image receiving surface and the liquefied extrusion material forms a thin layer between the planar member 1340 and the image receiving surface during the printing operation. For example, FIG. 13B depicts an arrangement of the extrusion material 1348 that extrudes from the activated nozzles 1326B and 1326C onto an image receiving surface, which is depicted as the upper surface of the three-dimensional printed object 140 of FIG. 1 for illustrative purposes. In FIG. 13B, the extruded extrusion material 1348 fills a gap between the surface of the object 140 and the surface of the planar member 1340. The heated planar member 1340 smoothes the extruded extrusion material 1348 and enables the extrusion material 1348 to remain liquefied for a short period while the printhead 1300 and planar member 1340 move along the process direction to form swaths of the extrusion material while operating two or more nozzles simultaneously. The planar member 1340 also prevents an undesirable accumulation of excess extruded material between the nozzles in the face of the printhead 1300. Arrangements of the extrusion material that are located proximate to one another may merge to form a substantially continuous arrangement, such as the arrangement of extrusion material 1348 that includes merged arrangements of the extrusion material extruded from nozzles 1326B and 1326C.

In some printhead configurations two or more nozzles in a an extrusion printhead may partially or completely overlap each other in the process direction, such as when a printhead moves along a curved path or forms corners between linear segments of a process direction path. The nozzles extrude overlapping arrangements of the extrusion material that would otherwise form a thicker layer than other regions where only a single nozzle extrudes the extrusion material, which would otherwise produce a layer of the three-dimensional printed object with a non-uniform thickness. However, in the printhead 1300 the planar member 1340 spreads and smooths the overlapping arrangements of extrusion material to produce an arrangement of the extrusion material with a uniform thickness even in regions where multiple nozzles extrude overlapping arrangements of the extrusion material.

Figure 14A:
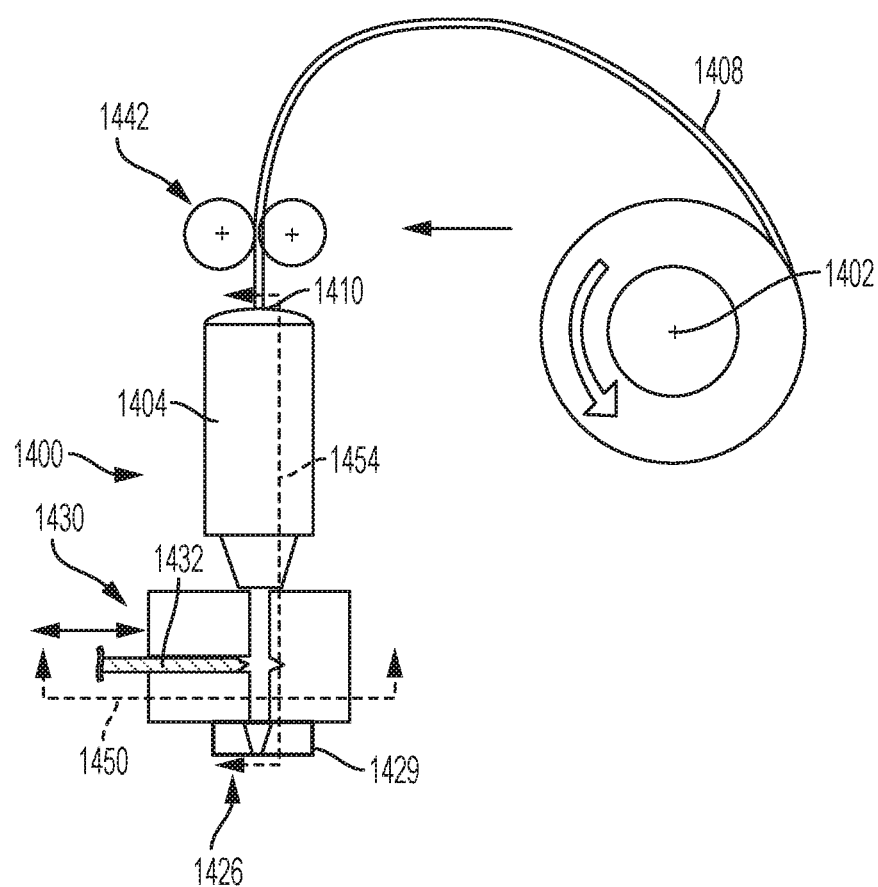
FIG. 14A is a schematic diagram of another extrusion printhead that includes a chamber to store melted extrusion material, fluid outlets that provide the melted extrusion material to a plurality of nozzles, and an array of valves that control block or enable the flow of extrusion material through individual nozzles.

FIG. 14A depicts another embodiment of an extrusion printhead 1400 that includes a pressure chamber storing liquefied extrusion material that is extruded through at least one nozzle. The printhead 1400 is another embodiment of the printhead 108 that is suitable for use in the printer 100 and other three-dimensional object printers that employ extrusion printheads. The multi-nozzle extrusion printhead 1400 includes a plurality of nozzles in the array 1426 that are each fluidly coupled to a single pressure chamber 1420 and a valve assembly 1430 that controls a flow of extrusion material from the pressure chamber 1420 to the individual nozzles in the array 1426. In FIG. 14B, the valve assembly 1430 is shown in more detail in a cross-sectional bottom view taken along line 1450 and looking up into the valve assembly. In FIG. 14C, the pressure chamber 1420 and nozzles in the array 1426 are shown in more detail in another cross-sectional side view taken along line 1454 and looking into the printhead.

The printhead 1400 includes a pressure chamber 1420 that is configured to receive extrusion material from a single supply of extrusion material, and a valve assembly 1430. The printhead 1400 includes a housing 1404 that forms the pressure chamber 1420 including a plurality of valves that enable or disable the flow of extrusion material through individual fluid conduits that couple the pressure chamber with a plurality of nozzles in the array 1426 in the extrusion printhead 1400.

In the extrusion printhead 1400, the housing 1404 includes an opening 1410 that enables an extrusion material 1408 to enter the pressure chamber 1420. The housing 1404 optionally includes an integrated or externally mounted heat sink (not shown) that prevents overheating of the pressure chamber 1420 and controls cool down of the printhead 1400 when the printhead 1400 is deactivated. In the illustrative embodiment of FIG. 14A, the extrusion material 1408 is a filament 1408 of a solid ABS plastic or other suitable extrusion material from an extrusion material supply 1402.

In FIG. 14C, the housing 1404 includes one or more heaters 1412, such as electrical resistance heaters, which heat the pressure chamber 1420 and melt the solid extrusion material 1408 to form a fluid reservoir of the melted extrusion material in the chamber 1420. One or more rollers, such as rollers 1442, include actuators that control a feed rate for the filament of the extrusion material 1408 into the pressure chamber 1420 in the extrusion printhead 1404. The controller 128 adjusts the feed rate to maintain a supply of the melted extrusion material in the pressure chamber 1420 based on the number of valves in the valve assembly 1430 that are opened to enable extrusion of the extrusion material, a fluid pressure level sensed within the pressure chamber 1420, or on an expected volume of the extrusion material that the printhead 1404 extrudes onto the image receiving surface. The three-dimensional volume between the printhead 1404 and the image receiving surface depends upon the lateral area covered by the predetermined pattern of the extrusion material, which the controller 128 optionally identifies based on the number of activated nozzles during operation, and the z-axis distance between the face of the printhead 1404 and the image receiving surface. In another embodiment, the controller 128 adjusts the feed rate of the filament based on a velocity of relative movement between the printhead and the image receiving surface in the process direction. In another embodiment, a DC electric motor drives the filament drive rollers, and the current to the DC motor is controlled to maintain a level of torque for the motor and rollers at a pre-defined level during material extrusion. The operation of the DC motor at a substantially constant level of torque provides a controlled level of pressure within the pressure chamber and provides automatic compensation for variations in the number of open nozzles in the system.

The extrusion printhead 1400 couples a single supply of extrusion material to a plurality of nozzles in the nozzle array 1426. A plurality of fluid outlets in the housing 1404 place the pressure chamber 1420 in fluid communication with the nozzles in the array 1426. For example, the fluid outlet 1424 places the pressure chamber 1420 in fluid communication with the nozzle 1428 (FIG. 14B and FIG. 14C). The melted extrusion material extrudes through the nozzles that remain in fluid communication with the chamber 1420 either through gravity or through a positive pressure force that is applied to the pressure chamber 1420 to expel the melted extrusion material through the nozzles in the array 1426. During operation, however, the printhead 1400 only extrudes extrusion material through one or more of the nozzles at selected times to form specific arrangements of extrusion material. In the printhead 1400, the valve assembly 1430 includes a plurality of valves that each controls the flow of extrusion material from the pressure chamber 1420 to one of the nozzles in the array 1426. The valve assembly 1430 includes a plurality of valves that are arranged transverse to the fluid outlets between the pressure chamber 1420 and the nozzles 1426. Each valve includes an electromechanical actuator (not shown) and a moveable member, such as metal pins that are depicted in FIG. 14B including pins 1432 and 1434. The metal pins are formed from stainless steel, aluminum, or any other metal or alloy that is suitable for use in contact with the liquefied extrusion material and in the operating temperature range of the printhead. The electromechanical actuator moves the moveable member along a linear path between a first position where the member blocks the flow of the extrusion material through the fluid outlet and a second position where the member enables the extrusion material to flow through the fluid outlet. In one embodiment, the electromechanical actuator is an electromagnetic actuator that moves a metal pin via an electromagnetic force in response to an electric current, while in another embodiment the electromechanical actuator is a piezo-electric actuator that generates a mechanical force to move the member in response to an electric current.

In the embodiment of FIG. 14C, the nozzles in the array 1426 are formed through a planar member 1429. The planar member 1429 is similar in structure and function to the planar member 1340 that is described above in conjunction with the printhead 1300. During operation of the printhead 1400, the activated nozzles in the array 1426 extrude the extrusion material onto an image receiving surface, and the planar member 1429 engages the extruded extrusion material to fill gaps between arrangements of extrusion material that are extruded from nearby nozzles in the printhead 1400 and to maintain a uniform thickness for each layer of the extrusion material.

In the configuration that is illustrated in FIG. 14C, one electromechanical actuator in the valve assembly 1430 moves the moveable member 1134 to a first position that blocks a flow of fluid through the fluid outlet 1425. In the first position, a portion of the valve member 1434 moves into the fluid outlet 1425 to block the flow of extrusion material through the fluid outlet 1425. In another valve, the electromechanical actuator moves the member 1432 to a second position that opens the fluid outlet 1424 to enable the extrusion material to flow from the pressure chamber 1420 through the nozzle 1428. In the second position, the member 1432 is withdrawn from the fluid outlet 1424 to enable the fluid extrusion material to flow through the outlet 1424.

In embodiments of the printer 100 that use the printheads 1300 or 1400, the controller 128 is operatively connected to the electromechanical actuators in each valve of the valve assembly 1430. During operation, the controller 128 operates the valves either to enable or disable the extrusion of extrusion material from different nozzles in the printhead 1400 to form arrangements of the extrusion material corresponding to the three-dimensional object image data 136 in each layers of the three-dimensional printed object 140. More particularly, the controller 128 operates the electromechanical actuators to move one or more valve members into the first position to close a first set of selected valves while the electromechanical actuators move other valve members into the second position to open one or more of the remaining valves. The controller 128 opens and closes the valves to activate or deactivate some or all of the nozzles in the printhead at various times during a printing operation.

Figure 9A:
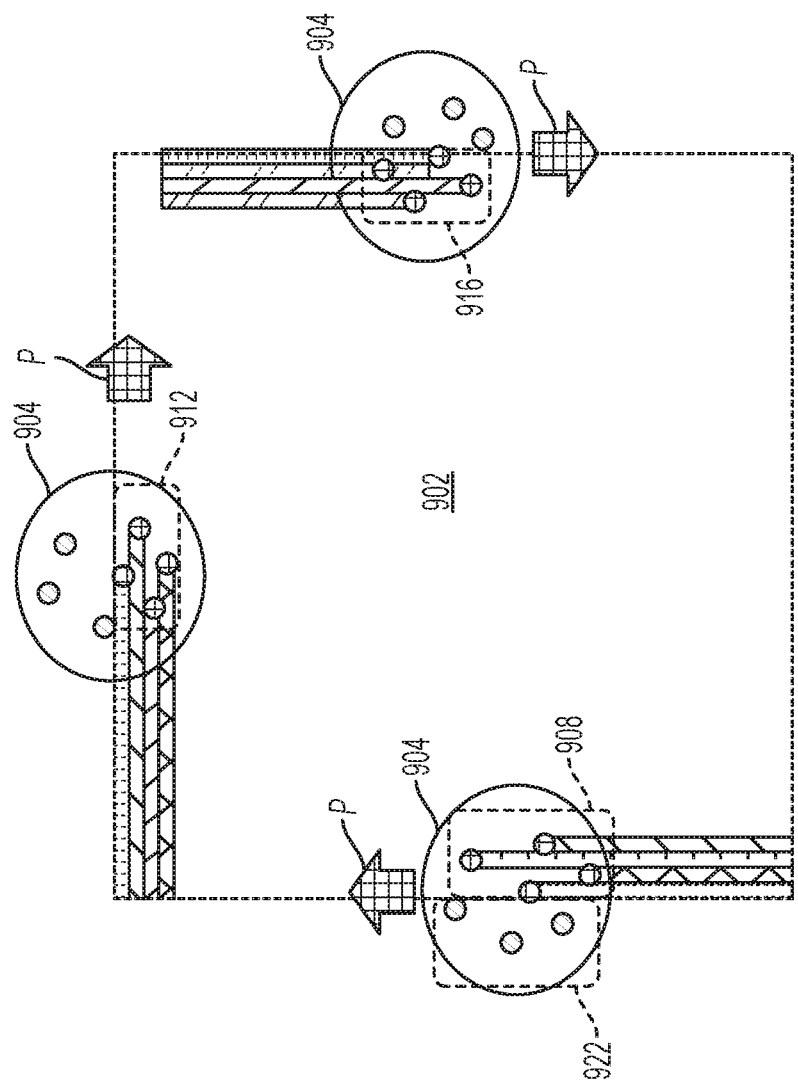
FIG. 9A is a diagram of a multi-nozzle extrusion printhead with a first portion of an array of nozzles that operate concurrently to fill a region on a surface.
Figure 9B:
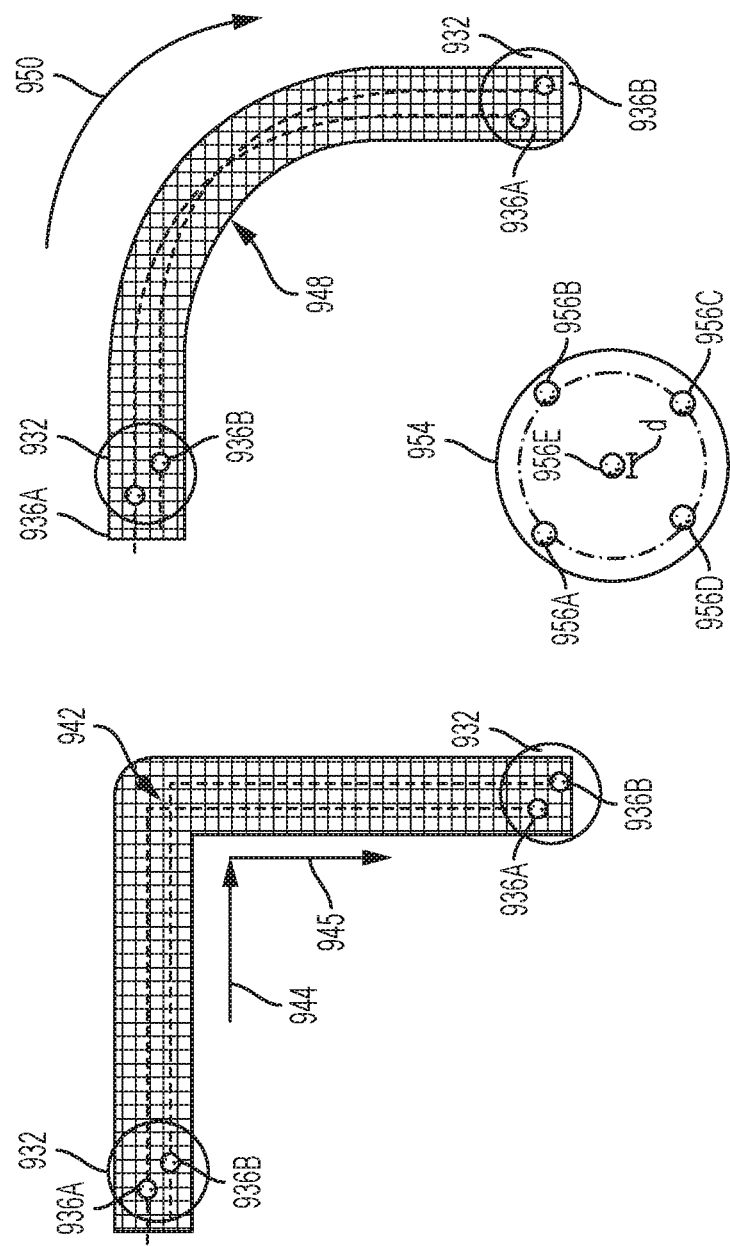
FIG. 9B is a diagram of a multi-nozzle extrusion printhead forming a corner from two linear swaths and a curved swath of extrusion material.
Figure 10:
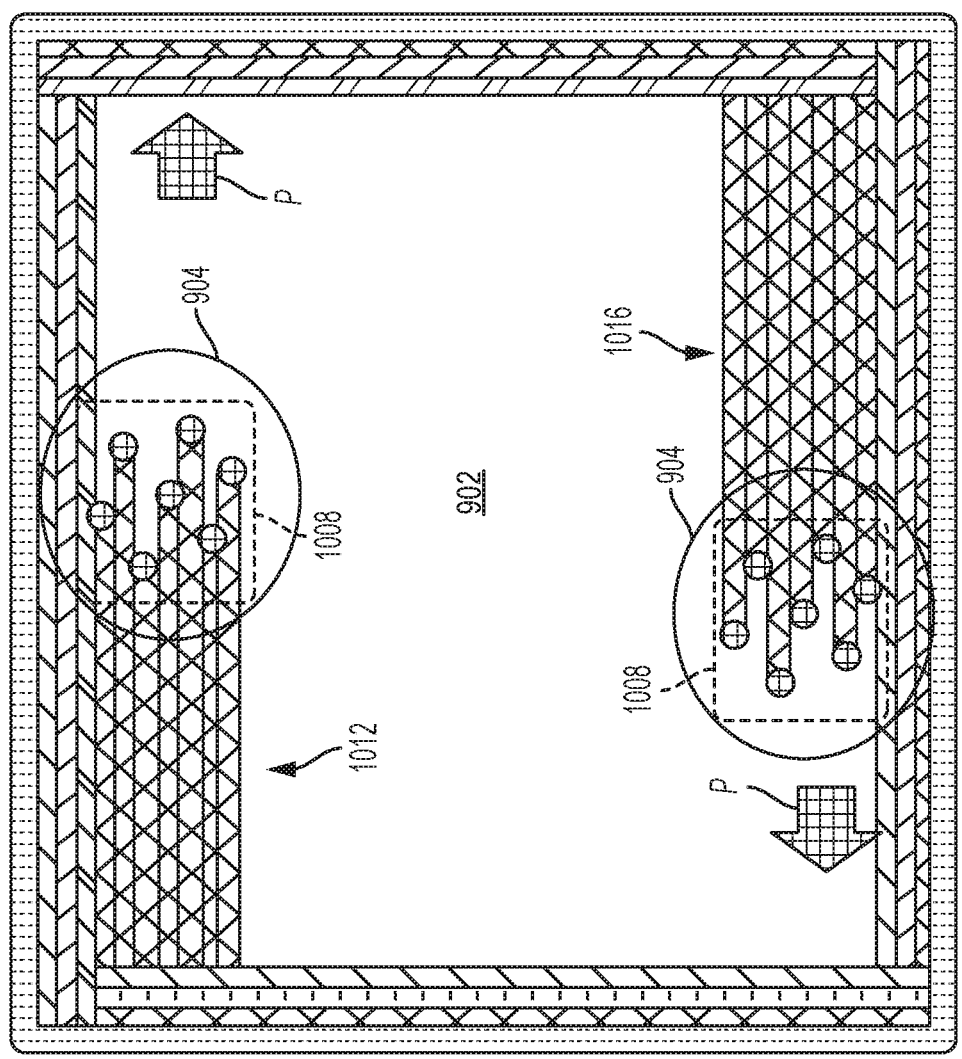
FIG. 10 is a diagram of the multi-nozzle extrusion printhead of FIG. 9A with a second portion of the array of nozzles operating concurrently to fill the region on a surface.

While the printheads 1300 and 1400 are depicted with a single row of nozzles and corresponding valves in a one-dimensional linear arrangement, alternative printhead configurations include multiple rows of nozzles and valves for a two-dimensional array of nozzles that cover substantially the width of the printhead in the cross-process direction. Examples of two-dimensional arrays of nozzles are depicted in FIG. 9A, FIG. 9B, and FIG. 10. In some configurations, any one of the nozzles in a multi-nozzle extrusion printhead could be used to print the outline of a given layer, and the controller 128 distributes the operation of forming portions of the outline across some or all of the nozzles to balance the wear on the nozzles and ensure an even distribution of material flow throughout the printhead. Polymer extrusion material that remains at an elevated temperature for longer than a predetermined time can experience a degradation in material properties. The printhead embodiments described above ensure a balanced material flow throughout the extrusion printhead to reduce or eliminate degradation of the extrusion material.

Figure 15:
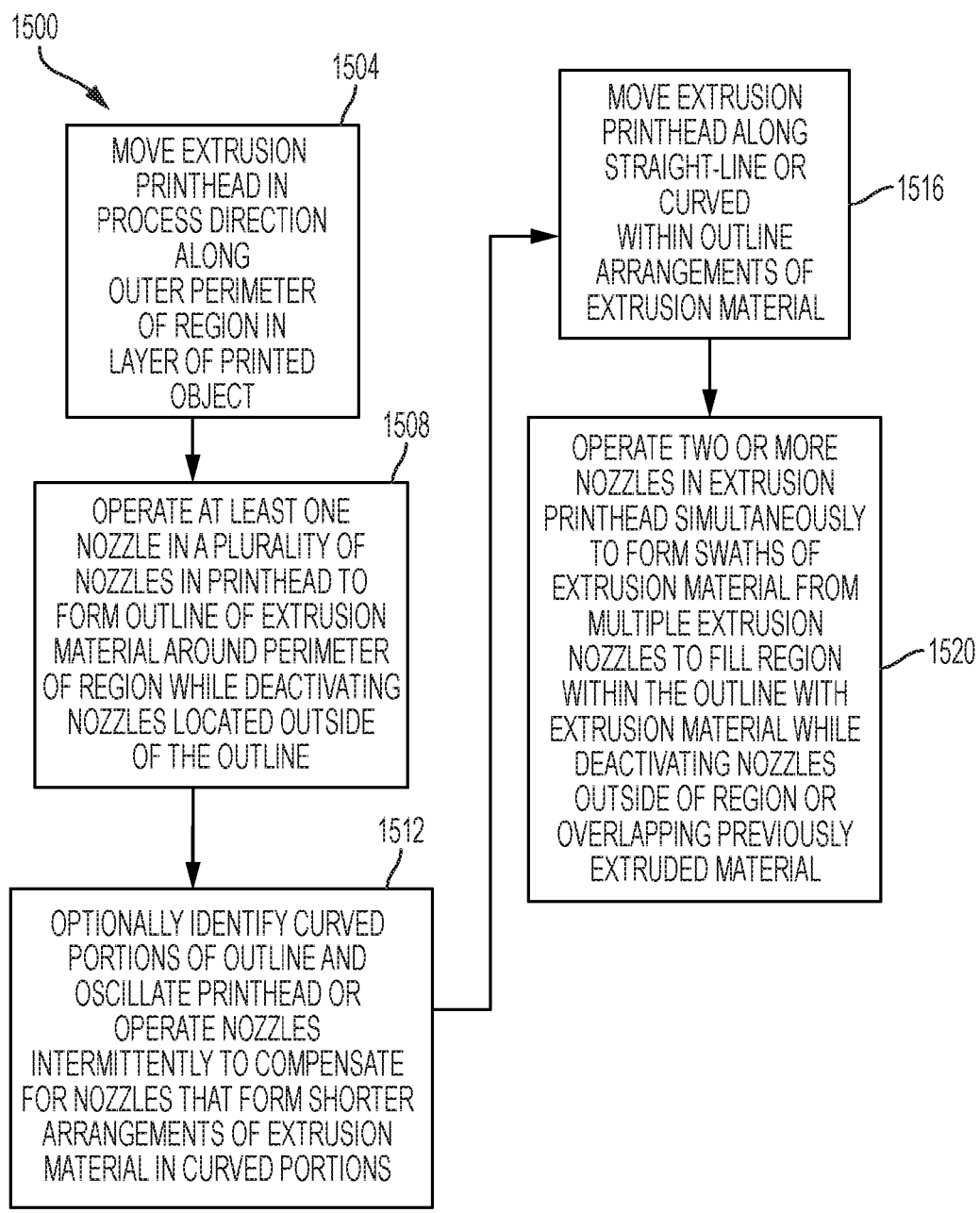
FIG. 15 is a block diagram of a process for the operation of a multi-nozzle extrusion printhead.

FIG. 15 depicts a process 1500 for the operation of a three-dimensional printer, such as the printer 100 of FIG. 1, to form a portion of a three-dimensional printed object using a multi-nozzle extrusion printhead. The process 1500 is suitable for use with printers that employ any of the multi-nozzle extrusion printhead embodiments described herein, although the process 1500 is not exclusively limited to use with the multi-nozzle printhead configurations described herein. A three-dimensional object printer performs the process 1500 to form at least a portion of one layer of a three-dimensional printed object, and in many configurations the printer performs the process 1500 multiple times to form multi-layer three-dimensional printed objects. In the description below, a reference to the process 1500 performing a function or action refers to the operation of a controller to execute stored program instructions to perform the function or action using one or more components in a three-dimensional object printer. The process 1500 is described in conjunction with the printer 100 of FIG. 1 for illustrative purposes.

Figure 3:
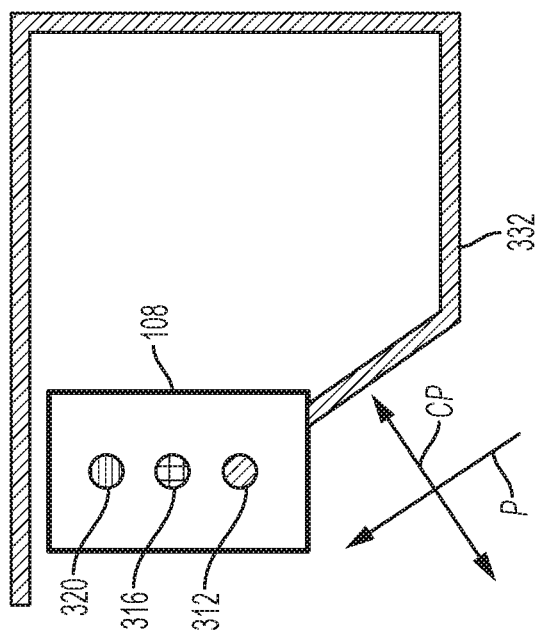
FIG. 3 is a diagram of a multi-nozzle extrusion printhead forming an outline of extrusion material around the perimeter of a region on a surface.

The process 1500 begins as the printer produces relative motion between an extrusion printhead and an image receiving surface in a process direction along an outer perimeter of a region for one layer of a three-dimensional printed object (block 1504). In the printer 100, the controller 128 operates the X/Y actuators 150 to move the printhead 108 along both linear and curved paths around the perimeter of a region on the surface of the support member 102 and the upper layer of the three-dimensional printed object 140. In other printer configurations, a different set of actuators move the support member to produce the relative motion or move both the printhead and the support member to produce the relative motion. As described above, in the printer 100 the controller 128 retrieves image data corresponding to one layer of the 3D printed object from the 3D object data 138 in the memory 132. In one embodiment, the controller 128 processes the image data to generate printhead path control data 138 that include a series of paths for relative motion between the extrusion printhead and the image receiving surface to form arrangements of the extrusion material. More particularly, the controller 128 operates the X/Y actuators 150 to move the printhead in a path that defines a perimeter of a region for one of layer of the three-dimensional printed object 140. For example, as depicted in FIG. 3, a printhead 108 with three extrusion nozzles 312, 316, and 320 moves along a perimeter path 332 while operating only a single nozzle 312 to form an arrangement of extrusion material along the outer perimeter of a region. In some printhead configurations, the diameter of the single nozzle 312 is less than than the diameters of the remaining nozzles in the printhead. Thus, the patterns of extrusion materials emitted from the orifice of the smaller diameter nozzle 312 occupy less space and can reproduce finer details than the remaining nozzles with larger nozzle orifice diameters. After forming the outline, the printer operates some or all of the nozzles in the printhead, including nozzles with the larger diameter, to fill in the region within the outline. Different portions of the path of movement for the printhead can include both linear (straight-line) segments and curved segments. In alternative embodiments, an external computing device, such as a personal computer or other suitable computing system, generates the printhead path control data 138 and provides the printhead path control data 138 to the controller 128 through a peripheral input-output (I/O) interface such as USB or through a data network interface.

During the process 1500, the controller 128 operates at least one nozzle in the plurality of nozzles in the printhead to form an arrangement of the extrusion material in an outline of the perimeter around the region as the printer generates the relative movement between the printhead and the image receiving surface along the path of the outline (block 1508). In other embodiments, the controller 128 operates one nozzle or a group of nozzles that have narrower outlet diameters to form the outline with narrower arrangements of the extrusion material to form the outline with a high spatial resolution. For example, in FIG. 3 if the nozzle 312 has a narrower diameter than the nozzles 316 and 320, then the controller 128 operates the nozzle 312 to form the outline 332. In other embodiments, the controller 128 operates multiple nozzles in the printhead to form multiple arrangements of the extrusion material around the perimeter of the region and within the region to increase the effective throughput rate of the three-dimensional object printer. Additionally, the controller 128 deactivates nozzles in the printhead that are positioned at locations that lie outside of the outline while one or more of the remaining nozzles form the outline of extrusion material. In the embodiment of FIG. 1, the controller 128 identifies the nozzles that are inside or outside of the region based on the printhead path control data 138 and the predetermined geometry of the nozzles in the multi-nozzle printhead 108. The controller 128 closes valves in the printhead or halts the supply of extrusion material to individual nozzles to prevent the deactivated nozzles from emitting the extrusion material.

As described above in FIG. 2A and FIG. 2B, in some printhead embodiments the physical layout of the nozzles in the printhead 108 forms a maximum separation between any two nozzles in the cross-process direction, and the controller 128 optionally operates the Zθ actuator 154 to adjust the distance between nozzles corresponding to the predetermined distance in the 3D image data. In embodiments of the printer 100 that include a multi-nozzle printhead with varying cross-process direction separation between adjacent nozzles, the controller 128 identifies cross-process direction distance between a first arrangement of an extrusion material formed by a first nozzle in the printhead and a second arrangement of the extrusion material formed by a second nozzle in the printhead with reference to the 3D object image data 136 for one layer of the three-dimensional object.

In some printer configurations the controller 128 positions the printhead 108 over the surface of the three-dimensional printed object 140 or other suitable image receiving surface with a narrow gap between the nozzles and the image receiving surface along the Z axis. For example, in one embodiment the gap is approximately 0.1 mm, although alternative printer configurations may operate with narrower or larger gaps. In a printhead that incorporates one or more nozzles in a planar member, such as the printheads 1300 and 1400 discussed above, the extruded extrusion material fills the gap between the image receiving surface and the printhead. The planar member on the printhead engages and spreads the extrusion material while the extrusion material remains in a liquid or semi-liquid state to enable different arrangements of extrusion material from nozzles in the printhead to merge into a single arrangement of the extrusion material. Additionally, the planar member maintains spreads the extrusion material to maintain a uniform thickness of the extrusion material layer even if two or more nozzles form overlapping arrangements of the extrusion material on the image receiving surface.

Figure 6:
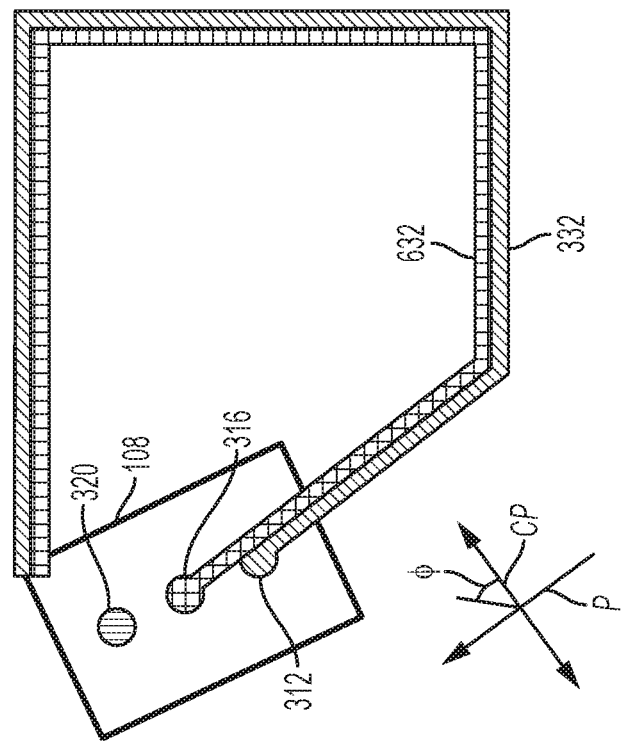
FIG. 6 is a diagram of the multi-nozzle extrusion printhead of FIG. 5 forming two concentric outlines of extrusion material having a second distance between the two concentric outlines.
Figure 5:
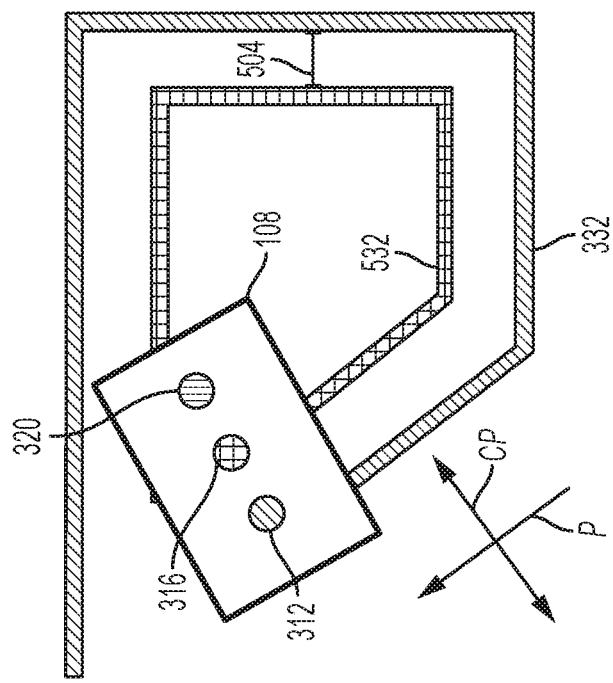
FIG. 5 is a diagram of a multi-nozzle extrusion printhead forming two concentric outlines of extrusion material having a first distance between the two concentric outlines.

FIG. 5 depicts two arrangements of the extrusion material 332 and 532 that the printhead 108 forms with a first cross-process direction separation 504. The controller 128 adjusts the angle of the printhead 108 relative to the cross-process direction axis CP to produce the separation. FIG. 6 depicts another arrangement of extrusion material with two sets of extrusion material 332 and 632 that are formed by the nozzles 312 and 316, respectively, in the printhead 108. In the configuration of FIG. 6, the controller 128 operates the Zθ actuator 154 to rotate the printhead 108 about the Z axis by an angle φ relative to the cross-process direction axis CP. The rotation of the printhead 108 reduces the separation between the nozzles 312 and 316 in the cross-process direction, and the printhead 108 forms the parallel arrangements of the extrusion material 332 and 632 with the two patterns of extrusion material being formed adjacent to one another with substantially no gap between the two arrangements of extrusion material.

FIG. 9A depicts another configuration of a printhead 904 that includes a two-dimensional array of nozzles. In the printhead 904, the nozzles are staggered to enable the printhead 904 to extrude extrusion material in parallel arrangements with little or no space between adjacent nozzles in the cross-process direction. In the configuration of FIG. 9A, the controller 128 operates a selected set of nozzles in the printhead 904 simultaneously to form different portions of the outline or to form swaths within an outline of the extruded material. For example, in FIG. 9A the controller 128 selectively activates the nozzles in groups 908, 912, and 916, to form different arrangements of extrusion material on the image receiving surface in an outline around a predetermined region of the image receiving surface, such as the square region that is depicted in FIG. 9A. Additionally, the controller 128 deactivates nozzles in the printhead 904 if those nozzles are positioned at locations that lie outside of the outline. For example, while the controller 128 activates the group of nozzles 908 to form a portion of the outline in FIG. 9A, the controller 128 also deactivates the group of nozzles 922 that lie outside of the perimeter of the region 902. As depicted in FIG. 9A, the controller 128 selectively activates and deactivates different nozzles in the printhead as the printhead moves to different locations along the process direction to form the outline with the predetermined shape based on the 3D object image data 136 and printhead path control data 138.

As depicted in FIG. 9A, the controller 128 operates the actuators in the printer 100 to generate the relative motion between the printhead 904 and the image receiving surface to move the printhead 904 in a process-direction path P around an outline of the region 902. The controller 128 operates different subsets of the extrusion nozzles in the printhead 904 to form different arrangements of extrusion material in the outline that surrounds the region 902. In the illustrative embodiment of FIG. 9A, the controller 128 operates a first group of nozzles 908, a second group of nozzles 912, and a third group of nozzles 916 to form three different sides of the outline around the region 902. In the example of FIG. 9A, the staggered nozzles in the printhead 904 form arrangements of the extrusion material that are substantially adjacent to one another without gaps between the arrangements of extrusion material. The two-dimensional array of nozzles in the printhead 904 are arranged in a staggered configuration to enable the printhead 904 to form a continuous swath when the printhead is moved in a first linear direction and when moved in a second direction which is orthogonal to the first direction, such as when forming different sides of the outline depicted in FIG. 9A. In another operating mode, the controller 128 adjusts the cross-process direction separation between parallel arrangements of the extrusion material by selecting different sets of nozzles that correspond to the predetermined cross-process direction separation between the printed arrangements of the extrusion material.

The printhead 904 of FIG. 9A is not configured to be rotated about the Zθ axis in the same manner as the printheads depicted in FIG. 3-FIG. 8. Instead, the arrangement of the nozzles in the printhead enables the printhead to form corners between linear swaths of extrusion material and curved swaths of extrusion material without requiring rotation of the printhead. FIG. 9B depicts a simplified printhead embodiment 932 that includes two nozzles 936A and 936B. In one configuration, the controller 128 operates the X/Y actuators 150 to generate relative movement between the printhead 932 and an image receiving surface to form two linear swaths 944 and 945. Both of the nozzles 936A and 936B extrude the extrusion material to form the swaths. At the corner location 942 between the swaths, the two nozzles 936A and 936B briefly overlap one another as the process direction of the relative printhead movement turns the corner. In another configuration, the X/Y actuators 150 generate relative printhead motion along a curved swath 950. As the printhead 932 enters the curve, the nozzles 936A and 936B form the exterior and interior portions of the curve, respectively, but the nozzles briefly overlap at location 948 and at the end of the curve the nozzle 936A forms the interior and the nozzle 936B forms the exterior of the curve.

Even though a portion of both of the swaths depicted above includes a region of overlap between the extruded arrangements of extrusion material from two different nozzles, the printer 100 forms both of the swaths with uniform extrusion material widths and thicknesses during a printing operation. The liquid extrusion material spreads after being extruded from the nozzles to form arrangements with uniform widths and thicknesses even if portions of the swath include overlapping arrangements of the extrusion material. Additionally, as described above in conjunction with the printheads 1300 and 1400, the planar member on the printhead that holds the nozzles also engages the extrusion material to form a uniform layer of the extrusion material in each swath. In some configurations, a printhead that includes nozzles with a diameter d and having the nozzles arranged with a minimum separation between neighboring nozzles of a distance of 2d is suitable for use in the process 1500. For example, in FIG. 9B the printhead 954 includes five nozzles 956A-956E in a polar configuration with a distance of at least 2d between neighboring nozzles. While the printhead 954 is an illustrative embodiment of a suitable multi-nozzle extrusion printhead, alternative configurations include, but are not limited to, a multi-row grid or rectangular array of nozzles with a separation of at least 2d between neighboring nozzles.

Referring again to FIG. 15, during the process 1500, the printer 100 may form some arrangements of the extrusion material in the outline around the perimeter of the region with curved shapes. In some printhead embodiments, the nozzles in the printhead extrude the extrusion material at approximately the same rate. The controller 128 optionally identifies the curved portions of the path of movement for the printhead with reference to the printhead path control data 138 and optionally controls the operation of the printhead to maintain a uniform distribution of the extrusion material in both the inner and outer portions of the curve (block 1512). In one configuration that is described in more detail in conjunction with FIG. 7, the controller 128 operates the Zθ actuator 154 to oscillate the printhead. In another configuration that is described in more detail in conjunction with FIG. 8, the controller 128 operates some of the nozzles on the inner portion of the curves with shorter lengths activate and deactivate the nozzle on the inner curve intermittently.

The controller 128 adjusts the operation of the printhead 108 for curved paths because each nozzle in the extrusion printhead 108 extrudes the extrusion material at substantially the same volumetric rate (e.g., 0.01 cm$^3$/sec). To subtend a given angle of a curve, the controller 128 nominally operates multiple nozzles for a single length of time required for the printhead to move through the full angle, even though the linear distance that is covered by an outer nozzle is often substantially larger than the linear distance covered by an interior nozzle. However, the nozzles that form shorter linear arrangements of the extrusion material extrude the extrusion material at the same rate as the nozzles forming the longer linear arrangements, which potentially produces an uneven surface since the shorter linear arrangements of extrusion material in the inner curves include substantially the same amount of extrusion material as the longer linear arrangements in the outer curves. By contrast, in the linear arrangements described above, the controller 128 operates the nozzles that form inner segments of the outlines for shorter periods of time than the nozzles that form the outer portions of the outlines so parallel linear arrangements of the extrusion material do not encounter the same issue with greater volumes of the extrusion material being formed in the interior arrangements of extrusion material.

In the embodiment that is depicted in FIG. 7, the controller 128 operates the Zθ actuator 154 to oscillate the printhead 108 about the Z axis to form arrangements of the extrusion material that have uniform densities and surfaces. The Zθ actuator 154 produces the oscillating pattern of movement in the printhead 108 while the X/Y actuators move the printhead 108 in the process direction along the curved path. The oscillation of the printhead 108 increases the linear length of the interior curved arrangement of the extrusion material to have a similar length to the linear length of an outer curved arrangement of the extrusion material. FIG. 7 illustrates the operation of the printhead 108 with oscillation to form two curved arrangements of the extrusion material 704 and 708. In FIG. 7, the printhead 108 forms the arrangement of extrusion material 704 along a curved path, and the controller 128 identifies a linear length of the curved path for the arrangement 704 with reference to the printhead path control data 138 in the memory 132. The controller 128 also identifies the linear length of the curve for the inner arrangement of the extrusion material 708 and identifies both a magnitude and frequency of an oscillation for the printhead 108 that increases the total linear length of the inner arrangement 708 to be similar or equal to the linear length of the outer arrangement 708. For example, in one configuration the controller 128 introduces a sinusoidal waveform onto the curved path for the inner arrangement of the extrusion material 708. The controller 128 identifies both a magnitude and frequency for the sinusoidal oscillation or other pattern of oscillation that produces an inner curve with this oscillation yielding a linear length that is similar to the length of the outer arrangement of extrusion material 704.

During operation, the controller 128 operates the Zθ actuator 154 to produce the identified shape, amplitude and frequency of oscillation in the printhead 108 to form the arrangements of extrusion material 704 and 708 that are depicted in FIG. 7. In the illustrative example of FIG. 7, the nozzle 312 is located at or near the axis of rotation for the Zθ actuator 154, and the oscillation of the printhead 108 produces little or no effect on the outer curved arrangement of the extrusion material 704. The inner curved arrangement of the extrusion material 708 includes the oscillating pattern that increases the total linear length of the inner arrangement of built material 708 to be similar to the outer arrangement 704. The inner arrangement of extrusion material 708 has a similar density to the outer arrangement 704 and the oscillation of the printhead 108 enables the printer 100 to form multiple concentric curved arrangements for the extrusion material with uniform density and thickness in each layer of a three-dimensional printed object.

FIG. 8 depicts another process for the extrusion printhead 108 during formation of two curved arrangements of the extrusion material including an outer arrangement 804 that is formed by the nozzle 312 and an inner arrangement 812 that is formed by the nozzle 316. In the process depicted in FIG. 8, the controller 128 identifies a first linear length of the outer arrangement of the extrusion material 804 and a second linear length of the inner arrangement of the extrusion material 812. The controller 128 then identifies a ratio of the second linear length to the first linear length, and operates the nozzle 316 in an intermittent manner with a predetermined frequency and a duty cycle corresponding to the identified ratio. For example, if the arrangement of extrusion material 804 has a length of 30 mm and the arrangement of extrusion material 812 has a length of 27 mm, then the controller 128 identifies the ratio (%10) for a duty cycle of operation for the nozzle 316 (90%). The controller 128 operates the nozzle 316 over a series of predetermined time intervals (e.g. 0.1 second intervals) with the nozzle 316 being activated to extrude extrusion material during a 90% portion of the interval (e.g. 0.09 seconds) while the nozzle 316 is deactivated and does not extrude extrusion material during another portion of the interval (e.g., 0.01 seconds). Since the nozzle 316 extrudes the extrusion material in a liquid form, the liquid extrusion material fills the gaps formed when the nozzle 316 is deactivated and the inner curved arrangement of extrusion material 812 has substantially the same density and height as the outer arrangement of extrusion material 804.

Figure 4:
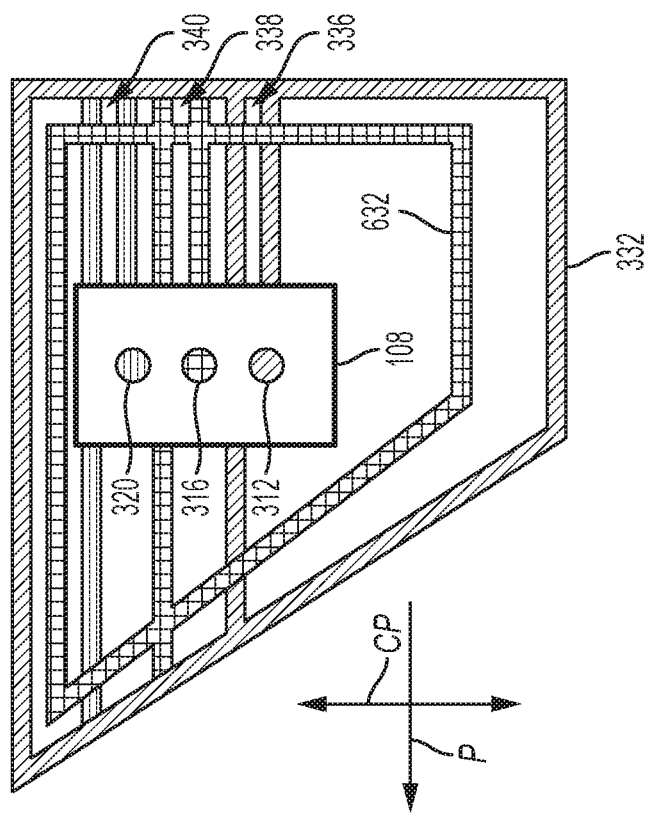
FIG. 4 is a diagram of the multi-nozzle extrusion printhead of FIG. 3 applying an extrusion material to the region surrounded by the outline of extrusion material on the surface.

Process 1500 continues as the controller 128 moves the extrusion printhead along straight-line or curved swath paths within the region formed by the outlines of arrangements of extrusion material (block 1516) and operates two or more nozzles in the printhead simultaneously to form swaths of the extrusion material that fill at least a portion of the region with a predetermined pattern of the extrusion material (block 1520). During the formation of swaths, the controller 128 activates two or more nozzles in the printhead simultaneously to form the swaths of extruded material within the outline. Additionally, the controller 128 also selectively deactivates a portion of the nozzles that may move to positions overlapping already formed regions of the extruded material or that move to locations outside of the perimeter of the printed extrusion material. For example, FIG. 4 depicts the printhead 108 applying multiple swaths of the extrusion material to form a pattern of the extrusion material in the region formed by the arrangement of extrusion material 332 including extruded lines 336, 338, and 340 from the nozzles 312, 316, and 320, respectively.

FIG. 10 depicts the printhead 904 forming swaths of extrusion material during a fill operation. In FIG. 10, the X/Y actuators 150 move the printhead 904 along straight-line paths to fill in a region within an outline formed by the extrusion material. FIG. 10 depicts the formation of two swaths of the extrusion material including swath 1012 and swath 1016. FIG. 10 depicts all of the extrusion nozzles 1008 in the printhead 904 in an activated configuration to form the swaths, but in some configurations, the controller 128 deactivates some of the nozzles in response to the controller 128 identifying that the nozzles have moved outside of the swath area or the perimeter surrounding the region. In the embodiment of FIG. 1, the controller 128 identifies the nozzles that are inside or outside of the region based on the printhead path control data 138 and the predetermined geometry of the nozzles in the multi-nozzle printhead 108. The controller 128 closes valves in the printhead or halts the supply of extrusion material to individual nozzles to prevent the deactivated nozzles from emitting the extrusion material. In some configurations, the extrusion printhead fills the entire region with extrusion material to form a solid layer, while in other embodiments the printhead forms a grid, honeycomb, or other suitable pattern that partially fills the region. In the printer 100, the controller 128 controls the activation and deactivation of individual nozzles independently to enable the printhead to form arrangements of extruded materials that start and stop at predetermined locations along the process direction P even if the nozzles are arranged in a staggered configuration. Similarly, the controller 128 selects the timing of operation for each nozzle to start or finish a given swath based on the arrangements of extrusion material that have been formed in previously printed swaths.

The printer 100 performs the process 1500 to form one or more regions in a layer of a three-dimensional printed object. For multi-layer objects, the printer 100 performs the process 1500 one or more times for each layer to form a three-dimensional printed object from a plurality of layers of the extrusion material.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
   a multi-nozzle extruder comprising:
      a plurality of nozzles, each nozzle in the plurality of nozzles being configured to emit an extrusion material; and
      a plurality of channels, each channel in the plurality of channels being connected to one nozzle in the plurality of nozzles in a one-to-one correspondence and configured to provide the extrusion material to the one nozzle;
   a first extrusion material supply having a spool configured to hold a filament of an extrusion material; and
   a first dispenser comprising:
      an inlet configured to receive the extrusion material from the first extrusion material supply;
      an outlet configured to direct the extrusion material received from the first extrusion material supply to one channel in the plurality of channels in the multi-nozzle extruder when positioned in alignment with the one channel;
      a cutter positioned proximate to the inlet of the first dispenser, the cutter configured to separate a first portion of the filament that enters the one channel in the plurality of channels from a second portion of the filament in the first extrusion material supply; and
      an actuator configured to move the outlet into alignment with at least two channels in the plurality of channels at different times to supply the extrusion material from the first extrusion material supply to the at least two channels in the plurality of channels at the different times.

2. The three-dimensional object printer of claim 1 further comprising:
   a second extrusion material supply configured to store an extrusion material that is different than the extrusion material in the first extrusion material supply; and
   the actuator being further configured to move the inlet of the first dispenser into alignment with the second extrusion material supply to receive the extrusion material from the second extrusion material supply.

3. The three-dimensional object printer of claim 1 further comprising:
   another actuator operatively connected to the cutter, the other actuator being configured to move the cutter to separate the first portion of the filament from the second portion of the filament.

4. The three-dimensional object printer of claim 1, the actuator being configured to rotate the first dispenser to align the outlet with at least two channels in the plurality of channels in the multi-nozzle extruder at different times.

5. The three-dimensional object printer of claim 1, the actuator being configured to translate the first dispenser along a predetermined path to align the outlet with each channel in the plurality of channels in the multi-nozzle extruder at different times.

6. The three-dimensional object printer of claim 1, wherein the first dispenser is positioned within a housing of the multi-nozzle extruder.

7. The three-dimensional object printer of claim 1, the actuator of the first dispenser being further configured to:
move the outlet into alignment with a first portion of the plurality of channels to supply the extrusion material from the first extrusion material supply to at least one channel in the first portion of the plurality of channels at different times;
and the three-dimensional object printer further comprising:
a second extrusion material supply configured to store extrusion material; and
a second dispenser comprising:
an inlet configured to receive the extrusion material from the second extrusion material supply;
an outlet configured to direct the extrusion material received from the second extrusion material supply to one channel in the plurality of channels in the multi-nozzle extruder when positioned in alignment with the one channel; and
an actuator configured to move the outlet of the second dispenser into alignment with a second portion of the plurality of channels to supply the extrusion material from the second extrusion material supply to at least two channels in the second portion of the plurality of channels at different times, the second portion of the plurality of channels being different than the first portion of the plurality of channels.

8. The three-dimensional object printer of claim 7, wherein the first extrusion material supply stores an extrusion material having a first color and the second extrusion material supply stores an extrusion material having a second color.

9. The three-dimensional object printer of claim 7, wherein the first extrusion material supply stores an extrusion material having a first material property and the second extrusion material supply stores an extrusion material having a different material property.

10. The three-dimensional object printer of claim 1 wherein at least one channel in the plurality of channels supplies the extrusion material to a melter and material extruder.

11. The three-dimensional object printer of claim 10, where the melter and material extruder extrudes material out of a single nozzle of the plurality of nozzles.

12. The three-dimensional object printer of claim 10, where the melter and material extruder extrudes material out of multiple nozzles of the plurality of nozzles.

13. A three-dimensional object printer comprising:
a first printhead having a first channel configured to receive an extrusion material;
a second printhead a second channel configured to receive the extrusion material; and
a dispenser an inlet configured to receive the extrusion material from a first extrusion material supply and an outlet configured to direct the extrusion material received from the first extrusion material supply to the first channel in the first printhead or the second channel in the second printhead;
a cutter positioned proximate to the inlet of the dispenser, the cutter configured to separate a first portion of the extrusion material that enters the first channel in the first printhead or the second channel of the second printhead from a second portion of the filament in the first extrusion material supply; and
an actuator configured to move the outlet of the dispenser into alignment with each of the first channel of the first printhead and the second channel of the second printhead at different times to supply the extrusion material from the first extrusion material supply to each of the first printhead and the second printhead at different times.

14. The three-dimensional object printer of claim 13 wherein the first printhead has a plurality of nozzles that each receive the extrusion material from the dispenser.

15. A three-dimensional object printer comprising:
a multi-nozzle extruder comprising:
a plurality of nozzles, each nozzle in the plurality of nozzles being configured to emit an extrusion material; and
a plurality of channels, each channel in the plurality of channels being connected to one nozzle in the plurality of nozzles and configured to provide the extrusion material to the one nozzle;
a first extrusion material supply configured to store an extrusion material; and
a first dispenser having an inlet configured to receive the extrusion material from the first extrusion material supply and an outlet configured to direct the extrusion material received from the first extrusion material supply to one channel in the plurality of channels in the multi-nozzle extruder when positioned in alignment with the one channel; and
an actuator configured to rotate the first dispenser to move the outlet into alignment with at least two channels in the plurality of channels in the multi-nozzle extruder at different times to supply the extrusion material from the first extrusion material supply to the at least two channels in the plurality of channels at the different times.

16. The three-dimensional object printer of claim 15, the first extrusion material supply further comprising:
a spool configured to hold a filament of the extrusion material.

17. The three-dimensional object printer of claim 16, the first dispenser further comprising:
a cutter configured to separate a first portion of the filament that enters one channel in the plurality of channels from a second portion of the filament in the first extrusion material supply.

18. The three-dimensional object printer of claim 17 further comprising:
a second extrusion material supply configured to store an extrusion material that is different than the extrusion material in the first extrusion material supply; and
the actuator being further configured to move the inlet into alignment with the second extrusion material supply to receive extrusion material from the second extrusion material supply.

19. The three-dimensional object printer of claim 17, the cutter being positioned proximate to the outlet of the first dispenser.

20. The three-dimensional object printer of claim 17 further comprising:
another actuator operatively connected to the cutter, the other actuator being configured to move the cutter to separate the first portion of the filament from the second portion of the filament.

21. The three-dimensional object printer of claim 17, the cutter being located in a fixed position within the first dispenser and the actuator in the first dispenser being further configured to move the filament into contact with the cutter to separate the first portion of the filament from the second portion of the filament.

22. The three-dimensional object printer of claim 17, the actuator being configured to translate the first dispenser along a predetermined path to align the outlet with each channel in the plurality of channels in the multi-nozzle extruder at different times.

* * * * *